United States Patent
Itsuji et al.

(10) Patent No.: US 11,474,033 B2
(45) Date of Patent: Oct. 18, 2022

(54) TERAHERTZ WAVE CAMERA SYSTEM AND METHOD FOR CONTROLLING TERAHERTZ WAVE CAMERA SYSTEM

(71) Applicant: CANON KABUSHIKI KAISHA, Tokyo (JP)

(72) Inventors: Takeaki Itsuji, Kanagawa (JP); Noriyuki Kaifu, Tokyo (JP); Eiichi Takami, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/171,840

(22) Filed: Feb. 9, 2021

(65) Prior Publication Data

US 2021/0247308 A1  Aug. 12, 2021

(30) Foreign Application Priority Data

Feb. 12, 2020 (JP) .............................. JP2020-021571
Dec. 1, 2020 (JP) .............................. JP2020-199354

(51) Int. Cl.
*G01N 21/3581* (2014.01)
*H04N 5/33* (2006.01)

(52) U.S. Cl.
CPC ........... *G01N 21/3581* (2013.01); *H04N 5/33* (2013.01)

(58) Field of Classification Search
CPC ........ G01N 21/3581; H04N 5/33; H04N 5/30; G01V 3/12; G01V 8/005; G01V 8/10
See application file for complete search history.

(56) References Cited

U.S. PATENT DOCUMENTS

2009/0314943 A1* 12/2009 Breit .................. G01N 21/3581
                                                                  250/341.1
2021/0281327 A1*  9/2021 Sato ..................... H04B 10/071

FOREIGN PATENT DOCUMENTS

| JP | 2014-200065 A | 10/2014 |
| JP | 2017-104476 A | 6/2017 |
| JP | 2018-087725 A | 6/2018 |
| JP | 2018-530763 A | 10/2018 |
| JP | 2019-105622 A | 6/2019 |
| WO | 2017/046278 A | 3/2017 |

* cited by examiner

*Primary Examiner* — David P Porta
*Assistant Examiner* — Meenakshi S Sahu
(74) *Attorney, Agent, or Firm* — Canon U.S.A., Inc. IP Division

(57) ABSTRACT

A system includes a first transmission unit configure to emit a first terahertz wave, a second transmission unit disposed at a position different from a position of the first transmission unit and configured to emit a second terahertz wave, a detection unit for detecting at least one of a first reflected terahertz wave that is a part of the first terahertz wave reflected from an object, or a second reflected terahertz wave that is a part of the second terahertz wave reflected from the object, and outputting image data based on the detected terahertz wave, and a first control unit configured to, under a condition set based on the image data, control at least one of an operation of the first transmission unit or an operation of the second transmission unit.

28 Claims, 15 Drawing Sheets

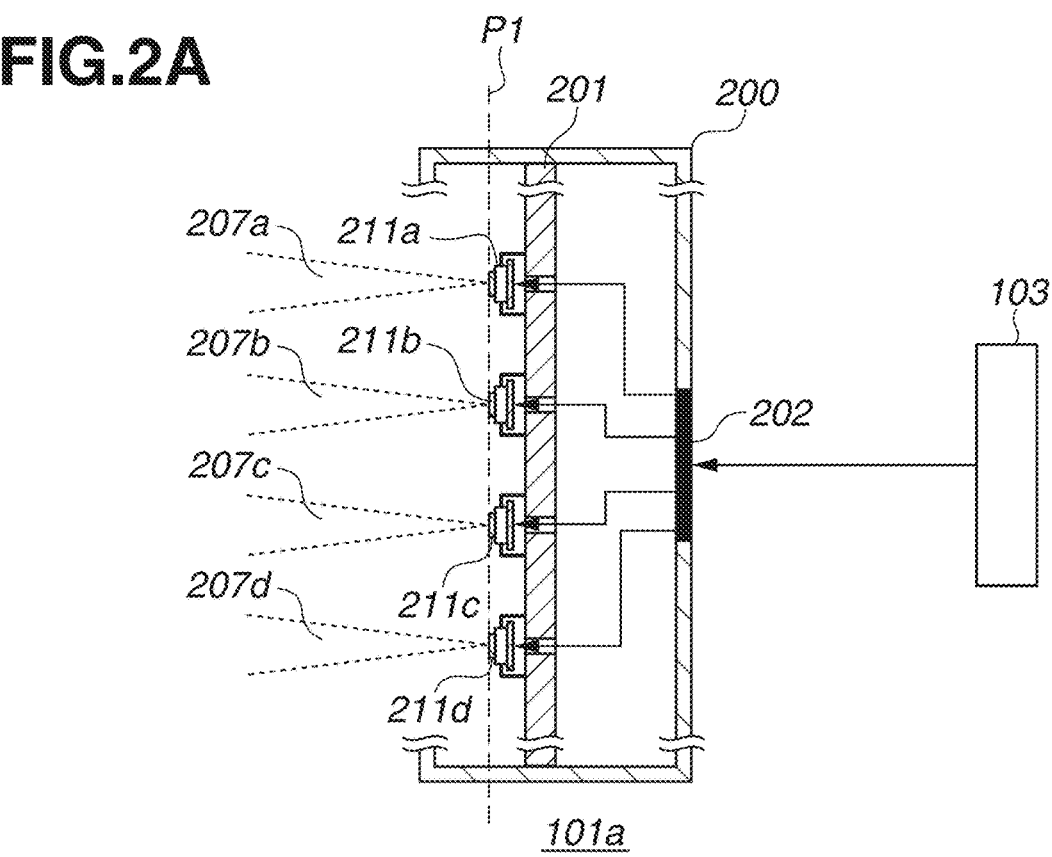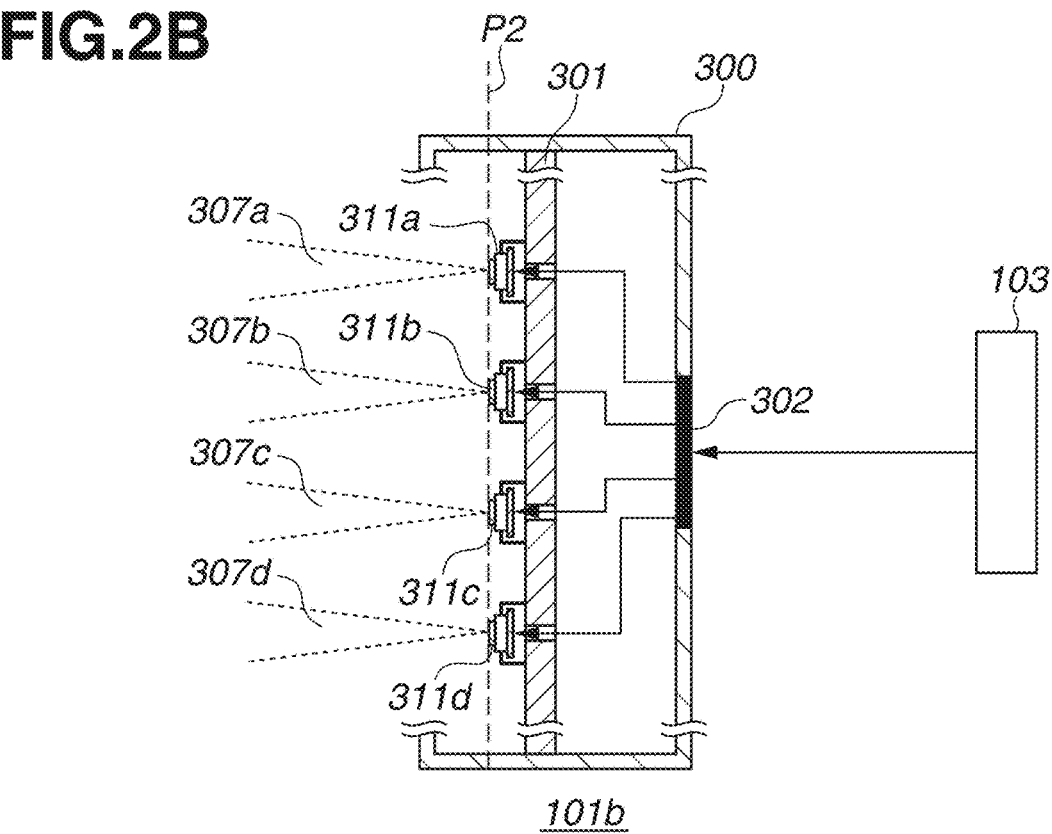

| CONDITION | TRANSMISSION UNIT 101a | TRANSMISSION UNIT 101b |
|---|---|---|
| 1231 | ON | OFF |
| 1232 | OFF | ON |
| 1233 | INCREASE OUTPUT | DECREASE OUTPUT |
| ⋮ | ⋮ | ⋮ |

TERAHERTZ WAVE CAMERA SYSTEM AND METHOD FOR CONTROLLING TERAHERTZ WAVE CAMERA SYSTEM

BACKGROUND OF THE DISCLOSURE

Field of the Disclosure

The aspect of the embodiments relates to a terahertz wave camera system.

Description of the Related Art

Terahertz wave is typically a radio wave having any frequency band in the range from 0.2 THz to 30 THz. The terahertz wave has a longer wavelength than those of visible light and infrared light, therefore is unlikely to be influenced by a scattering from an object, and has high transmission properties through many substances. The terahertz wave has a shorter wavelength than that of a millimeter wave and therefore enables high spatial resolution to be obtained. Making use of these features, the terahertz wave is expected to be applied to a safe imaging technique to replace an X-ray technique. For example, the terahertz wave is expected to be applied to a concealed object inspection technique, such as those used in a security check or a monitoring camera in a public place.

Japanese Patent Application Laid-Open No. 2018-87725 discusses a camera system to which a terahertz wave is applied. Japanese Patent Application Laid-Open No. 2018-87725 discusses a method for, in an active terahertz wave camera system, causing a plurality of terahertz wave light sources to generate terahertz waves, emitting the terahertz waves to an object, and detecting terahertz waves reflected from the object.

SUMMARY OF THE DISCLOSURE

One of aspects of the disclosure provides a system comprising: a first transmission unit configured to emit a first terahertz wave; a second transmission unit disposed at a position different from a position of the first transmission unit and configured to emit a second terahertz wave; a detection unit for detecting at least one of a first reflected terahertz wave that is a part of the first terahertz wave reflected from an object, or a second reflected terahertz wave that is a part of the second terahertz wave reflected from the object, and outputting image data based on the detected terahertz wave; and a first control unit configured to, under a condition set based on the image data, control at least one of an operation of the first transmission unit or an operation of the second transmission unit.

Further features of the present disclosure will become apparent from the following description of exemplary embodiments with reference to the attached drawings.

BRIEF DESCRIPTION OF THE DRAWINGS

FIGS. 2A and 2B are each a diagram illustrating an example of a configuration of a transmission unit according to the first exemplary embodiment.

DESCRIPTION OF THE EMBODIMENTS

Exemplary embodiments will be described in detail below with reference to the accompanying drawings. The following exemplary embodiments are not intended to limit the present disclosure. Although a plurality of features is described in the exemplary embodiments, not all the plurality of features is essential for the disclosure, and the plurality of features may be optionally combined together. Further, in the accompanying drawings, the same or similar components are designated by the same reference numbers, and are not redundantly described.

First, a terahertz wave will be described. Typically, the terahertz wave is a radio wave having any frequency band in the range from 0.2 THz to 30 THz. The terahertz wave has a longer wavelength than those of visible light and infrared light, therefore is unlikely to be influenced by a scattering from an object, and thus, has high transmission properties through many substances. The terahertz wave has a shorter wavelength than that of a millimeter wave and therefore enables high spatial resolution to be obtained. Making use of these features, the terahertz wave is expected to be applied to a safe imaging technique to replace an X-ray technique. Specifically, the imaging technique to which the terahertz wave is expected to be applied is a security check or a monitoring camera in a public place. A description will be given below of a terahertz wave camera system applicable to the security check or the monitoring camera to which the terahertz wave is expected to be applied.

When an object having a concealed object under a covering object is captured using an active terahertz wave camera system, a part of an emitted terahertz wave may be reflected from the covering object. As a result, an image can be obtained in which information based on a terahertz wave reflected from an unwanted interface, i.e., noise, is superimposed on information regarding the concealed object.

The surface of the object has a complicated shape and differs with respect to each object. In other words, the object has a combination of a plurality of reflective surfaces. Thus, with respect to each reflective surface of the object, the positional relationship between an illumination unit serving as a light source for the reflective surfaces and a detection unit may change. In a case where the object moves, the orientation of the object changes moment by moment, and therefore, according to the change in the orientation, the positional relationship between the illumination unit serving as the light source for the reflective surfaces forming the object and the detection unit may change moment by moment. Due to such a change in the positional relationship, an unwanted reflected terahertz wave among terahertz waves reflected from the object may be incident, and an image having a large amount of noise may be obtained.

First Exemplary Embodiment

Figure 1:
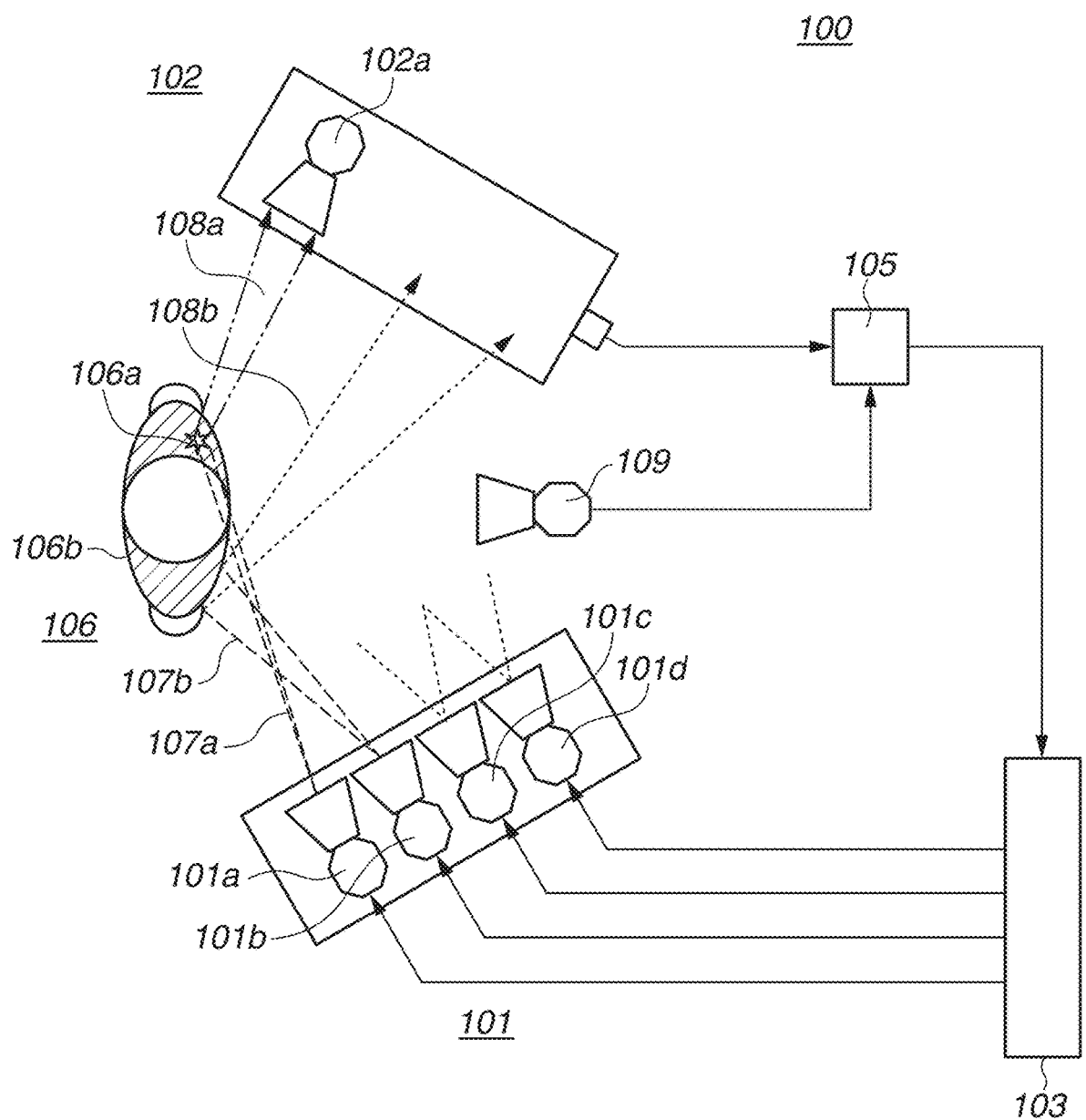
FIG. 1 is a diagram illustrating a configuration of a terahertz wave camera system according to a first exemplary embodiment.

FIG. 1 is a diagram illustrating the configuration of a terahertz wave camera system 100 according to a first exemplary embodiment. The terahertz wave camera system 100 includes at least an illumination unit 101, a detection unit 102, a control unit 103, and an image processing unit 105. The terahertz wave camera system 100 may include a visible camera 109. The illumination unit 101 emits terahertz waves to an object 106. The detection unit 102 detects terahertz waves reflected from the object 106. The terahertz wave camera system 100 is an active camera system.

The object 106 is, for example, a person or a physical body. The object 106 according to the present exemplary embodiment has at least a concealed object 106a and a covering object 106b. The covering object 106b covers a physical body. For example, the covering object 106b is a thing that a person wears, such as clothes or a wearable object, i.e., the thing that covers a person. For example, the covering object 106b is a thing that covers a physical body, such as corrugated fiberboard, an envelope, or a packaging material. The concealed object 106a is a physical body covered by the covering object 106b. Examples of the concealed object 106a include a dangerous article, such as a firearm or an explosive, an accessory or jewelry, or a small apparatus, such as a smartphone. An example of the concealed object 106a is one to be contained inside the covering object 106b. In the present exemplary embodiment, the object 106 is a person and is in a state where the object 106 hides the concealed object 106a such as a gun or a knife under the covering object 106b which is clothes. Examples of the object 106, however, are not limited to this, and can include a piece of mail in which the concealed object 106a as a weapon or an explosive is hidden in the covering object 106b which is a packing material, such as corrugated fiberboard or an envelope.

The illumination unit 101 includes at least a transmission unit 101a and a transmission unit 101b disposed at a position different from that of the transmission unit 101a. The transmission unit 101a emits a terahertz wave 107a, and the transmission unit 101b emits a terahertz wave 107b. FIG. 1 illustrates an example where the illumination unit 101 includes transmission units 101c and 101d in addition to the transmission units 101a and 101b. The number of transmission units included in the illumination unit 101 is not limited to this, and a single transmission unit or a plurality of transmission units may be included. The configurations of the transmission unit 101a and the like will be described in detail below. The terahertz waves 107a and 107b are emitted to the object 106.

Typically, the band of a terahertz wave used by the illumination unit 101 falls within the range from 0.2 THz to 30 THz. The band of the terahertz wave may have any frequency band, or may be a single frequency. A terahertz wave of 1 THz or less has sufficiently high transmission properties through clothes, which is a conceivable covering object 106b. To obtain the resolution of an image that enables the identification of the shape of the concealed object 106a, it is desirable to use a terahertz wave of 0.3 THz or more. Thus, the band of the terahertz wave according to the present exemplary embodiment is in the frequency range of 0.2 THz or more and 30 THz or less, preferably 0.3 THz or more and 1 THz or less.

The detection unit 102 is a terahertz wave camera that acquires the two-dimensional distribution of a reflected terahertz wave from the object 106. The details of the configuration of the detection unit 102 are discussed in Japanese Patent Application Laid-Open No. 2019-105622. The detection unit 102 includes a reception unit 102a that receives a terahertz wave. For example, the reception unit 102a includes a plurality of reception elements, and each of the plurality of reception elements has sensitivity to a terahertz wave. For example, the reception element includes a Schottky barrier diode and an antenna.

The detection unit 102 detects at least one of reflected terahertz waves 108a or 108b, and outputs the reflected terahertz wave as image data. The reflected terahertz wave 108a includes at least a part of the terahertz wave 107a reflected from the object 106. The reflected terahertz wave 108b includes at least a part of the terahertz wave 107b reflected from the object 106. The reflected terahertz wave 108a can be a reflected wave from the concealed object 106a of the object 106, and the reflected terahertz wave 108b can be a reflected wave from the covering object 106b of the object 106. The reception unit 102a according to the present exemplary embodiment can mainly receive and detect the reflected terahertz wave 108a.

The image processing unit 105 processes the image data output from the detection unit 102, thus generating a terahertz image. The image processing unit 105 makes a desired determination based on the generated terahertz image, and outputs a determination result to the control unit 103. Specifically, the image processing unit 105 includes a central processing unit (CPU) and a graphics processing unit (GPU).

The control unit 103 controls the operations of the illumination unit 101 and the detection unit 102. Further, the control unit 103 controls the operation of the illumination unit 101 based on the terahertz image or the determination result sent from the image processing unit 105. More specifically, the control unit 103 controls the transmission units 101a to 101d to change the terahertz wave 107a, the terahertz wave 107b, a terahertz wave 107c, and a terahertz wave 107d, respectively.

Figure 10A:
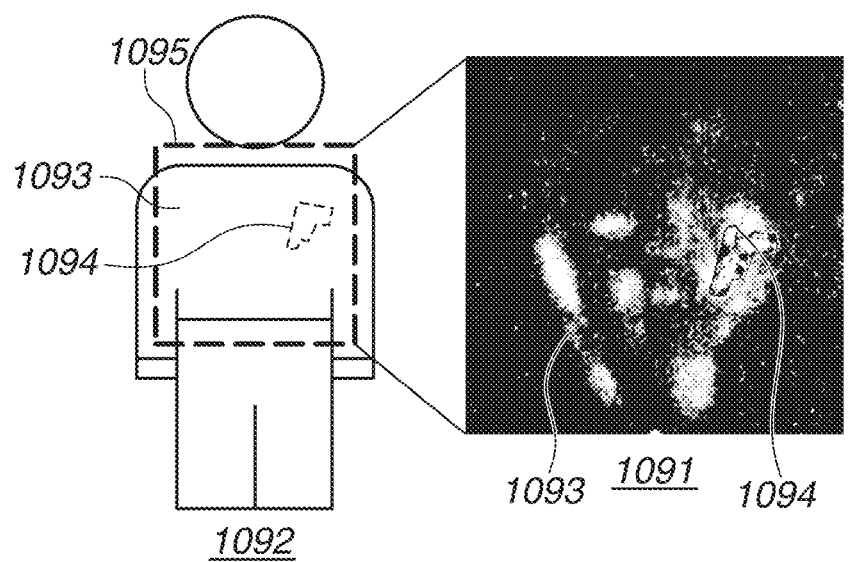
FIG. 10A is an image diagram illustrating the terahertz wave camera system according to each of the first and third exemplary embodiments.
Figure 10B:
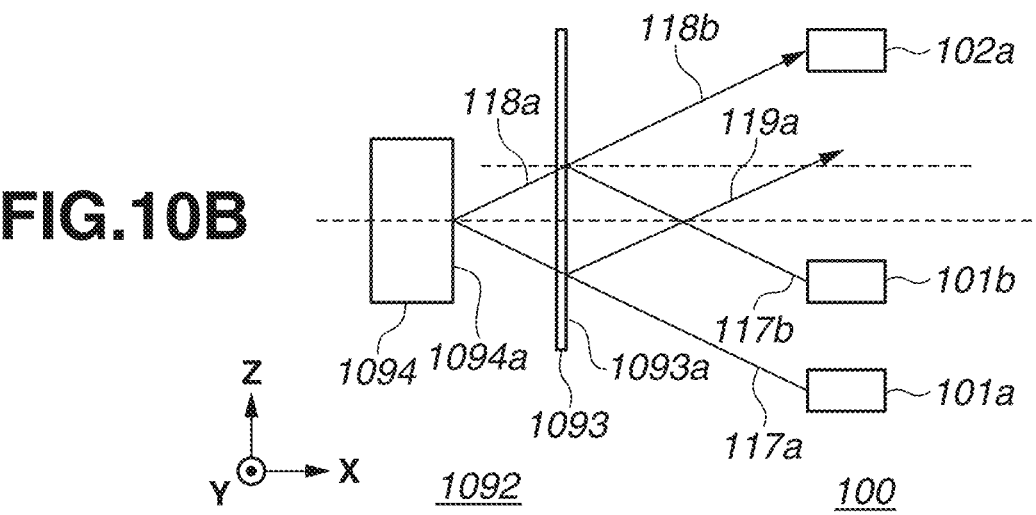
FIG. 10B is a schematic diagram illustrating the terahertz wave camera system according to the first exemplary embodiment.
Figure 10C:
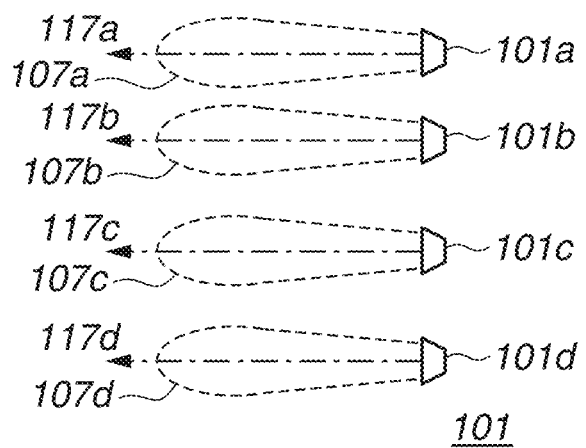
FIG. 10C is a diagram illustrating terahertz waves.

Referring now to FIGS. 10A to 10C, the terahertz wave camera system 100 according to the present exemplary embodiment will be described. As described above, for a security check and a monitoring camera there is demand for an object to be captured and whether or not the object includes a concealed object (e.g., a dangerous article, such as a firearm or an explosive, an accessory or jewelry, or a small apparatus, such as a smartphone) under a covering object (e.g., clothes or packing) to be checked. The present inventors have found that an image acquired by a terahertz wave camera system is an image in which images based on a plurality of reflected terahertz waves are superimposed on each other through a detailed study.

An electromagnetic wave including a terahertz wave has the following properties. If the electromagnetic wave is emitted to an uneven structure equal to or smaller than the wavelength of the electromagnetic wave, the electromagnetic wave is not scattered on the surface of the uneven structure, and is specularly reflected from the surface of the uneven structure. In other words, for a certain electromagnetic wave, an uneven structure smaller than the wavelength of the electromagnetic wave can be a specular surface. For example, the uneven structure of the skin surface of a human body and the uneven structure of a metal surface are smaller than the wavelength of the terahertz wave. Thus, for the terahertz wave, the skin surface of a person or a metal surface can be a specular surface. A part of the terahertz wave is transmitted through a fabric material used for clothes or a packing material, such as corrugated fiberboard or an envelope, and a part of the terahertz wave is reflected from the fabric material or the packaging material. Thus, in a case where a person who conceals a physical body under clothes as a covering object is observed using the terahertz wave, an image based on a reflected terahertz wave from the clothes, an image based on a reflected terahertz wave from the physical body, and an image based on a reflected terahertz wave from the person are superimposed on each other.

FIG. 10A is an image diagram illustrating the state where a plurality of terahertz wave reflected images is superimposed on each other, and for describing the present exemplary embodiment. An object 1092 is a person who has a physical body (e.g., a concealed object 1094) therewith under a covering object 1093. In this case, an image 1091 is obtained as a terahertz image. The image 1091 is an image in which an image derived from the covering object 1093, an image derived from the concealed object 1094, and an image derived from the skin surface of the person are superimposed on each other. If attention is paid to the concealed object 1094, images other than the image of the concealed object 1094 are superimposed on the image of the concealed object 1094, and therefore, it may be difficult to identify the concealed object 1094.

FIG. 10B is a schematic diagram illustrating superimposition of a plurality of terahertz wave reflected images, and for describing the present exemplary embodiment. FIG. 10B schematically illustrates the object 1092 illustrated in FIG. 10A and a main part of the terahertz wave camera system 100 illustrated in FIG. 1. With reference to FIG. 10B, a description will be given of an example of a case where reflected images are superimposed on each other.

As illustrated in FIG. 10A, the object 1092 has therewith the concealed object 1094 and the covering object 1093. In an X-direction, the covering object 1093 is located between the concealed object 1094 and the transmission units 101a and 101b. FIG. 10B illustrates the directional axes of terahertz waves. The directional axes of the terahertz waves will be described below.

The transmission unit 101a emits a terahertz wave 117a, and the transmission unit 101b emits a terahertz wave 117b. Much of the terahertz wave 117a is transmitted through the covering object 1093 and reflected from a surface 1094a of the concealed object 1094. The terahertz wave 117a becomes a reflected terahertz wave 118a, and the reflected terahertz wave 118a is detected by the reception unit 102a. Much of the terahertz wave 117b is reflected from a surface 1093a of the covering object 1093. The terahertz wave 117b becomes a reflected terahertz wave 118b, and the reflected terahertz wave 118b is detected by the reception unit 102a. Each of the terahertz waves 117a and 117b is not limited to a terahertz wave all of which is reflected and transmitted, and a part of the terahertz wave may be reflected and transmitted. A part of each of the terahertz waves 117a and 117b may attenuate, or may be absorbed. The terahertz wave detected by the reception unit 102a is the sum of the reflected terahertz waves 118a and 118b and includes information regarding the covering object 1093 and the concealed object 1094. Thus, the image 1091 as illustrated in FIG. 10A is acquired. A part of the terahertz wave 117a is reflected from the surface 1093a of the covering object 1093 and becomes a reflected terahertz wave 119a, but the reflected terahertz wave 119a is not incident on the reception unit 102a, and thus a description thereof is omitted.

To acquire an image of the concealed object 1094, only the reflected terahertz wave 118a is detected. That is, the image 1091 includes information as a noise such as the covering object 1093 and is an unclear image. In response, in the terahertz wave camera system 100 according to the present exemplary embodiment illustrated in FIG. 1, the control unit 103 performs control to make the output of the transmission unit 101b smaller than the output of the transmission unit 101a or to stop the transmission unit 101b. Such control enables reduction of the reflected terahertz wave 108b, which becomes noise.

The terahertz wave camera system 100 according to the present exemplary embodiment has a configuration including a plurality of transmission units disposed at different positions, a single reception unit, and a control unit. Alternatively, the configuration includes a single transmission unit, a plurality of reception units disposed at different positions, and a control unit. Yet alternatively, the configuration includes a plurality of reception units disposed at different positions, a plurality of transmission units disposed at different positions, and a control unit. With such a configuration of the terahertz wave camera system 100, it is possible to reduce the reflected terahertz wave 108b which becomes noise. Thus, the camera system 100 can obtain an image in which images superimposed on each other are reduced and noise is reduced.

FIG. 10C illustrates a beam pattern (the emission pattern) of the terahertz wave emitted from each of the four transmission units 101a to 101d illustrated in FIG. 1. As illustrated in FIG. 1, the transmission unit 101a emits the terahertz wave 107a, and the transmission unit 101b emits the terahertz wave 107b. The transmission unit 101c emits the terahertz wave 107c, and the transmission unit 101d emits the terahertz wave 107d. The directional axes of the terahertz waves 107a to 107d are indicated by terahertz waves 117a to 117d, respectively. As described above, the terahertz waves 117a and 117b illustrated in FIG. 10B indicate directional axes. A directional axis is the central axis of the directional characteristics of a terahertz wave from a transmission unit. For example, the directional axis is a straight line indicating the direction in which the terahertz wave having the highest intensity is emitted from the transmission unit. For example, the directional axis can be obtained as follows. A plurality of concentric spheres centered at the center of gravity of the transmission unit and having different radii is created. The position at which the terahertz wave has high intensity is determined for each spherical surface, and these positions are connected together. Thus, the directional axis can be obtained. The directional axis can also be obtained by simulation. Although the terahertz waves in FIG. 10B are indicated by directional axes, the terahertz waves in FIG. 10B are electromagnetic waves having spreads as illustrated in FIG. 10C.

Referring back to FIG. 1, the operation of the control unit 103 according to the present exemplary embodiment will be described in detail. The control unit 103 controls the operation of the illumination unit 101. According to a control signal from the control unit 103, the transmission units 101a to 101d of the illumination unit 101 can change the outputs and the operations of the transmission units 101a to 101d. Next, the control of the control unit 103 will be described in detail. To facilitate understanding, the following description will be given based on the assumption that the control unit 103 controls the two transmission units 101a and 101b. However, the number of transmission units that can be controlled by the control unit 103 is not limited to this.

The control unit 103 can perform at least the following three types of control. The control unit 103 can perform control for causing the transmission unit 101a to operate and stopping the transmission unit 101b. The control unit 103 brings the transmission unit 101a into a state where the transmission unit 101a emits the terahertz wave 107a. The control unit 103 brings the transmission unit 101b into a state where the transmission unit 101b does not emit the terahertz wave 107b. It can be said that the control unit 103 can perform control for bringing the transmission unit 101a into an emission state and bringing the transmission unit 101b into a non-emission state. The control unit 103 can perform control for stopping the transmission unit 101a and causing the transmission unit 101b to operate. The control unit 103 brings the transmission unit 101a into a state where the transmission unit 101a does not emit the terahertz wave 107a. The control unit 103 brings the transmission unit 101b into the state where the transmission unit 101b emits the terahertz wave 107b. It can be said that the control unit 103 can perform control for bringing the transmission unit 101a into a non-emission state and bringing the transmission unit 101b into an emission state. That is, the control unit 103 can perform control for switching the presence or absence of the output of the illumination unit 101. Hereinafter, an operating state will also be referred to as an "on state", and a stopped state will also be referred to as an "off state".

The operating or emission state is the state where the transmission unit emits the terahertz wave. The stopped or non-emission state is the state where the transmission unit does not emit the terahertz wave. If the transmission unit 101b is in the non-emission state, for example, the supply of a power supply voltage to the transmission unit 101b may be stopped. If the transmission unit 101b is in the non-emission state, a switch for controlling whether to emit the terahertz wave 107b from the transmission unit 101b may be turned off. Alternatively, a blocking object such as a shutter for blocking the terahertz wave 107b if the transmission unit 101b is in the non-emission state may be provided in the directional axis direction of the transmission unit 101b.

The control unit 103 can further perform control for adjusting the output of the illumination unit 101. The illumination unit 101 includes a transmission element that transmits a terahertz wave, and the output of the illumination unit 101 can be adjusted by changing the operating point of the voltage or the current of the transmission element. Alternatively, if the illumination unit 101 includes a plurality of transmission elements, the output of the illumination unit 101 can be adjusted by controlling the number of transmission elements to be operated. A change in the output can be checked using a detection apparatus capable of detecting a terahertz wave, or using the detection unit 102 of the camera system 100. A change in the output can also be checked by a method for monitoring the operating point of the illumination unit 101.

For example, the control unit 103 can perform control for making the output of the transmission unit 101a stronger than the output of the transmission unit 101b. The control unit 103 can perform control for making the output of the transmission unit 101a weaker than the output of the transmission unit 101b. The control unit 103 can perform control to make the output of the transmission unit 101a equal to the output of the transmission unit 101b.

The control unit 103 can perform control for reducing the difference between the output of the transmission unit 101a and the output of the transmission unit 101b. The control unit 103 can perform control for increasing the difference between the output of the transmission unit 101a and the output of the transmission unit 101b. The control unit 103 can perform control for keeping constant the difference between the output of the transmission unit 101a and the output of the transmission unit 101b and also change the output of the transmission unit 101a and the output of the transmission unit 101b.

As described above, the number of transmission units that can be controlled by the control unit 103 is not limited to this description. In other words, among a plurality of transmission units, the control unit 103 can cause a particular transmission unit to operate, stop the particular transmission unit, and switch the output of the particular transmission unit. Among a plurality of transmission units, the control unit 103 can cause a transmission unit belonging to a particular group to operate, stop the transmission unit belonging to the particular group, and switch the output of the transmission unit belonging to the particular group. The control unit 103 thus controls the operation of the illumination unit 101, reducing an unwanted reflected terahertz wave. Thus, it is possible to acquire an image in which noise is reduced.

The control unit 103 performs such control of the illumination unit 101 based on information output from the image processing unit 105. Next, the operation of the image processing unit 105 will be described.

Figure 9A:
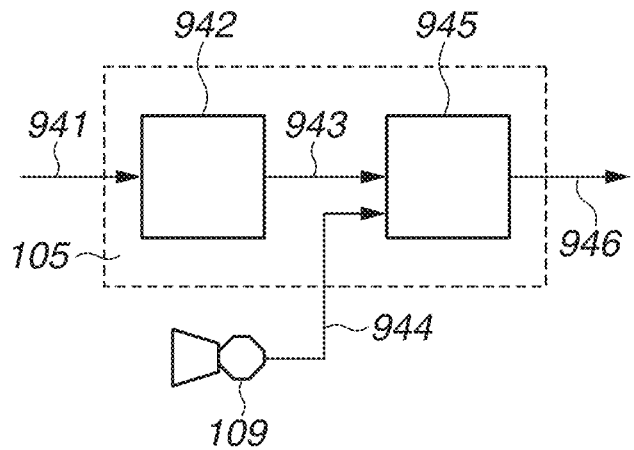
FIGS. 9A, 9B, and 9C are each a diagram illustrating an example of a configuration of an image processing unit.
Figure 9B:
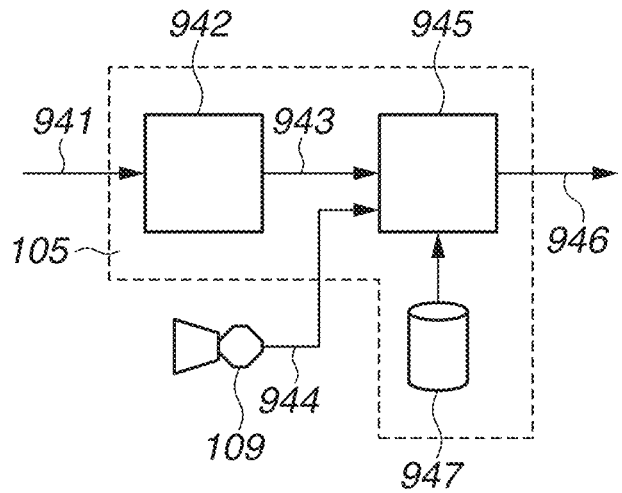
Figure 9C:
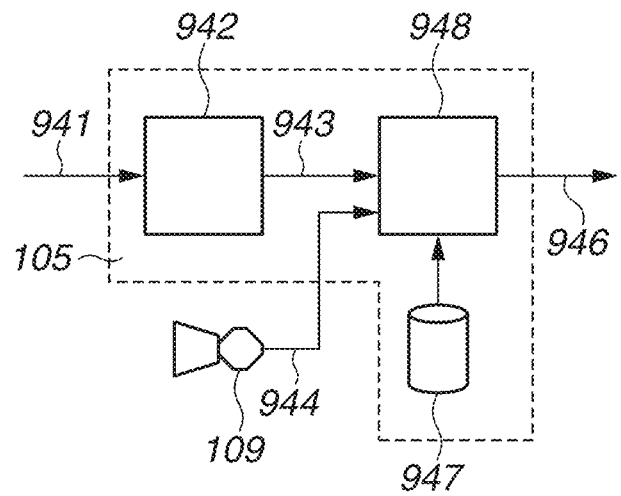

The image processing unit 105 generates a terahertz image based on image data output from the detection unit 102. The image processing unit 105 determines the shape or the type of the object 106 based on the terahertz image. As illustrated in FIG. 1, the terahertz wave camera system 100 may include the visible camera 109, and the image processing unit 105 may contrast the terahertz image with a visible image from the visible camera 109 to determine the shape of the object 106. The visible image (e.g., a visible image 944 illustrated in FIGS. 9A to 9C) includes shape information. With reference to this determination result, the control unit 103 controls the illumination unit 101. With reference to FIGS. 9A to 9C, the configuration of the image processing unit 105 will be described.

FIG. 9A is a diagram illustrating an example of the configuration of the image processing unit 105. The image processing unit 105 according to the present exemplary embodiment includes an image generation unit 942 and a determination unit 945. The image generation unit 942 converts image data 941 output from the detection unit 102 into a terahertz image 943. The image data 941 is unprocessed image data. The unprocessed image data is data output from an image sensor of the detection unit 102 without change, and is also termed "raw data". The terahertz image 943 is data obtained by converting the image data 941 into a recording format suitable for post-processing. The determination unit 945 determines a target that is being observed by the detection unit 102 with reference to the terahertz image 943. In the present exemplary embodiment, the terahertz image 943 having been subjected to the post-processing is used in the determination. Alternatively, the determination can also be made using the image data 941. Hereinafter, the determination including also a case where the terahertz image is used will occasionally be referred to as "making the determination based on the image data".

In the determination, the entire or partial matching or the correlation between a visible image 944 of the covering object 106*b* (see FIG. 1) from the visible camera 109 and the terahertz image 943 is calculated, for example. The determination unit 945 determines which of pieces of information regarding the concealed object 106*a* and the covering object 106*b* has a larger amount, and which of the concealed object 106*a* and the covering object 106*b* is being observed. The image processing unit 105 passes a determination result 946 to the control unit 103. The control unit 103 checks whether the specifying of a physical body to be observed and the determination result 946 match. If the specifying and the determination result 946 do not match, the control unit 103 controls the illumination unit 101.

FIG. 9B is a diagram illustrating another example of the configuration of the image processing unit 105. The image processing unit 105 includes the image generation unit 942, the determination unit 945, and a database 947. That is, the image processing unit 105 in FIG. 9B includes the database 947 in addition to the configuration of the image processing unit 105 in FIG. 9A. In the configuration of FIG. 9B, the visible camera 109 can also be omitted.

The database 947 is stored in, for example, a memory space in an apparatus, a server on a network, or a storage medium. The database 947 stores model image information including shape data about the object 106. Specifically, the database 947 stores a terahertz image of the object 106 acquired in advance and the condition of the terahertz image. The database 947 stores information obtained by processing the terahertz image (an edge enhancement image). In the configuration of FIG. 9B, the determination unit 945 makes a determination using the terahertz image stored in the database 947 and the terahertz image 943 acquired by the detection unit 102. Since a visible image is an external appearance image of the object 106, the visible image 944 mainly includes information regarding the covering object 106*b*. Thus, in a case where a determination is made using the visible image 944 and the terahertz image 943, it can be determined whether an image represented by the terahertz image 943 is the covering object 106*b*. In a case where a determination is made using the terahertz image in the database 947 and the terahertz image 943, it can be determined whether an image represented by the terahertz image 943 is the concealed object 106*a*. Alternatively, the database 947 may have a visible image. In this case, it is easy to omit the visible camera 109. Information stored in the database 947 is not limited to shape information. For example, the database 947 may store a classification filter based on statistical processing for use in a determination, which is created in advance, a trained machine learning model for use in a determination, and a data group (a data set) for use in machine learning. In the present exemplary embodiment, these pieces of information stored in the database 947 are also referred to as "shape data".

FIG. 9C is a diagram illustrating another example of the configuration of the image processing unit 105. The image processing unit 105 in FIG. 9C includes artificial intelligence (AI). The image processing unit 105 includes the image generation unit 942, the database 947, and an AI unit 948. Specifically, the AI unit 948 of the image processing unit 105 in FIG. 9C replaces the determination unit 945 of the image processing unit 105 in FIG. 9B.

The AI unit 948 has a trained machine learning model. For example, the trained machine learning model is constructed based on a data set regarding image information including shape information stored in the database 947. Using the trained machine learning model, the image processing unit 105 can determine whether the terahertz image 943 is the concealed object 106*a* or the covering object 106*b*. The AI unit 948 may have a deep learning function. Typically, a machine learning model requires supervised data with which an operator indicates a feature to pay attention to. The AI unit 948, however, has the deep learning function so that a feature can be automatically extracted. The AI unit 948 has the deep learning function, so that the determination accuracy of the image processing unit 105 improves according to an increase in the number of data sets.

In particular, the use of the deep learning function is suitable for learning the terahertz image 943. The visible image 944 is obtained by the visible camera 109 detecting and imaging scattered light from the object 106. By contrast, the terahertz image 943 is obtained by imaging specularly reflected light from the object 106 detected by the detection unit 102. The terahertz image 943 is obtained by imaging a reflected terahertz wave that has reached the detection unit 102, so that the fragmentary shape of the object 106 is imaged. The optical path of the specularly reflected light before reaching the detection unit 102 changes according to the orientation of the object 106. Thus, the image of the fragmentary shape changes according to the orientation of the object 106. The determination using the deep learning function is useful for estimating and determining the object 106 from fragmentary information.

Figures 12A, 12B:
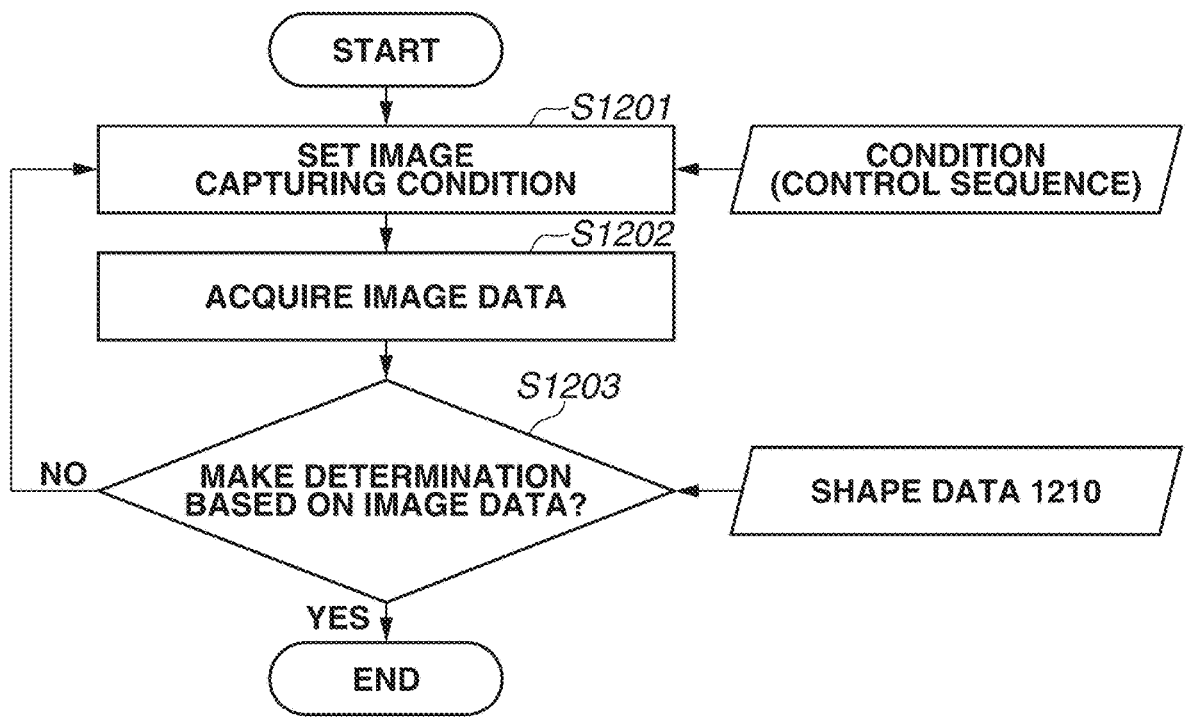
FIG. 12A is a flowchart illustrating an operation flow of the terahertz wave camera system according to the first exemplary embodiment.
FIG. 12B is a table illustrating conditions.

Referring now to FIG. 12A, in step S1201, an image capturing condition is set initially. The image capturing condition is the control sequence of the illumination unit 101 or the detection unit 102. Herein, the image capturing condition includes at least conditions 1231, 1232, and 1233 illustrated in FIG. 12B. Under the condition 1231, the transmission unit 101*a* is caused to operate, and the transmission unit 101*b* is stopped. Under the condition 1232, the transmission unit 101*a* is stopped, and the transmission unit 101*b* is caused to operate. Under the condition 1233, the output of the transmission unit 101*a* is increased, and the output of the transmission unit 101*b* is decreased. Under a condition, after the transmission unit 101*a* is caused to operate, the transmission unit 101*a* may be stopped, and the transmission unit 101*b* may be caused to operate. Another condition may be provided in advance, but the amount of change in the condition can also be appropriately set by the image processing unit 105. In this case, in step S1201, the image capturing condition is set by selecting the condition 1231.

Next, an image is captured under the image capturing condition based on the condition 1231. In step S1202, image data is acquired. Based on the image data, a terahertz image is generated. In step S1203, a desired determination is made, such as determining whether information included in the terahertz image mainly includes information based on the covering object 106b, or whether the terahertz image includes the concealed object 106a that matches shape data. Here, using shape data 1210, it is determined whether the terahertz image includes the concealed object 106a that matches the shape data 1210. In the determination in step S1203, if the terahertz image does not include the concealed object 106a that matches the shape data 1210 (NO in step S1203), the operation returns to step S1201. In step S1201, another condition, for example, the condition 1232, is selected as the image capturing condition, and image data is acquired again. In the determination in step S1203, if the terahertz image mainly includes information regarding the concealed object 106a that matches the shape data 1210, the capturing of the image ends. An image capturing condition for reducing noise can be specified, and therefore, it is possible to acquire an image with reduced noise.

Next, in the determination in step S1303, if the terahertz image mainly includes information regarding the concealed object 106a that matches shape data 1332 (YES in step S1303), the processing proceeds to step S1304. In step S1304, the image capturing condition for the terahertz image used in the determination is recorded. This record can be held as a condition 1333. The condition 1333 can also be said to be an actual image capturing condition.

Next, in step S1305 in a period 1313, an image capturing condition is set. The condition 1333 is selected as the image capturing condition. If the image capturing condition does not change, the image capturing condition is not changed. In step S1306, image data is acquired. Such a process enables the acquisition of image data with reduced noise.

When the terahertz wave camera system 100 is installed, the operation in periods 1311 and 1312 may be performed, then in a subsequent normal operation, the operation in the period 1313 may be performed. Alternatively, the operation in the periods 1311 to 1313 may be repeated in a normal operation.

Figure 5:
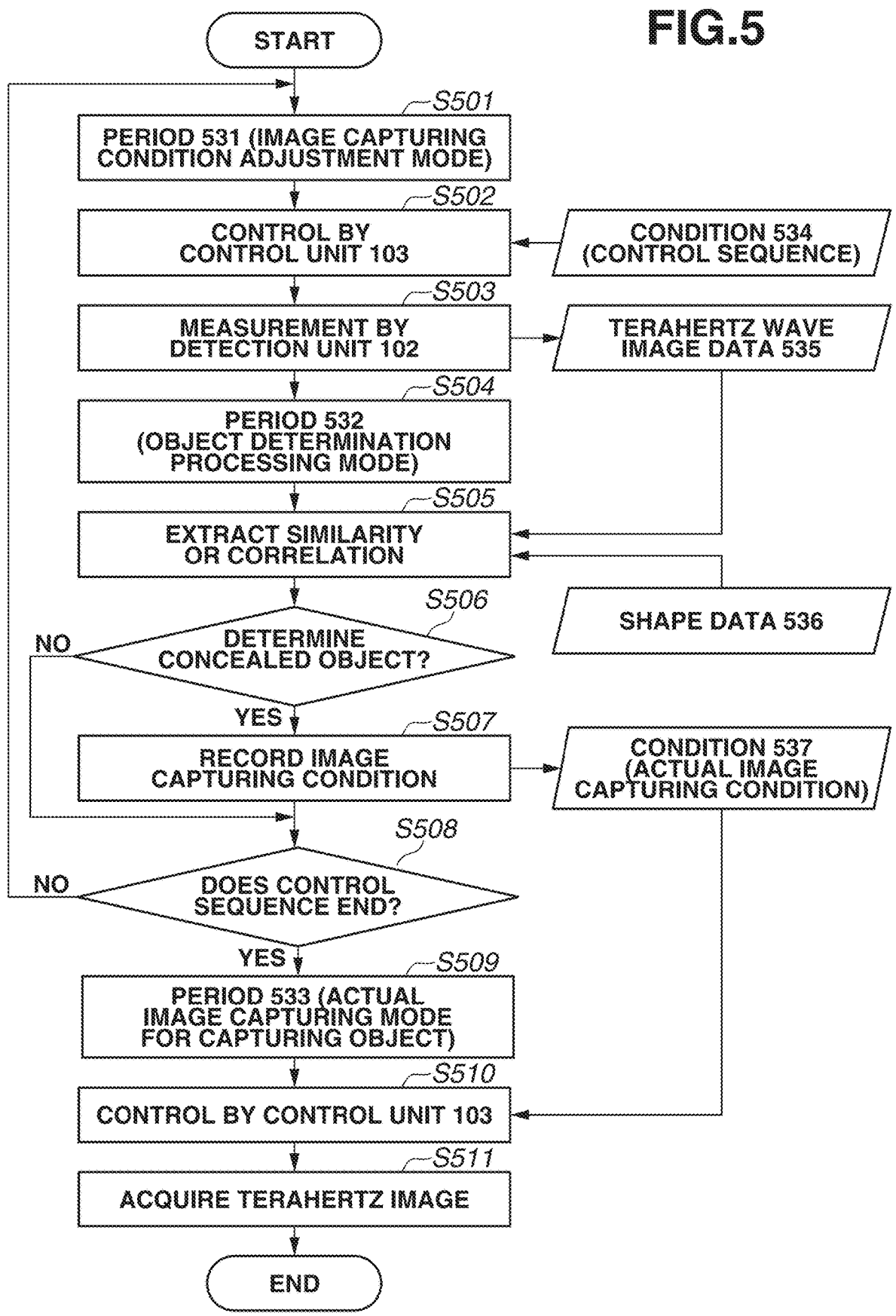
FIG. 5 is a flowchart illustrating an operation flow of the terahertz wave camera system according to the first exemplary embodiment.
Figure 13:
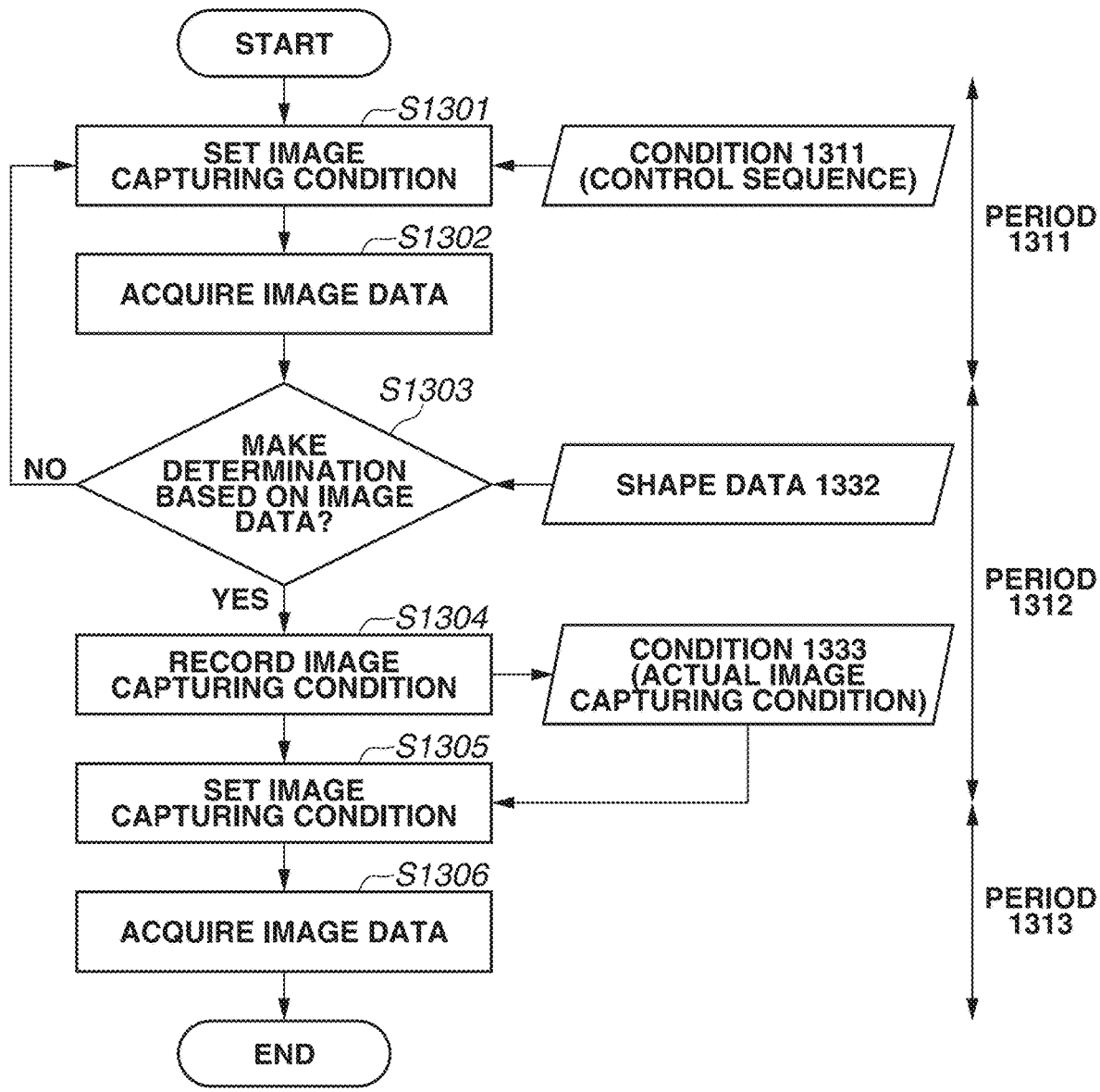
FIG. 13 is a flowchart illustrating an operation flow of the terahertz wave camera system according to the first exemplary embodiment.

Next, FIG. 5 is a flowchart illustrating a detailed operation of the terahertz wave camera system 100 according to the present exemplary embodiment. Here, an example of an operation for observing the concealed object 106a will be described. The flow in FIG. 5 corresponds to the flow in FIG. 13.

The operation flow in this example includes at least periods 531, 532, and 533. That is, the operation includes step S501 in the period 531, step S504 in the period 532, and step S509 in the period 533. Every time each of steps S501, S504, and S509 is performed, the operation of the apparatus switches.

The operation mode of the terahertz wave camera system 100 in the period 531 is an image capturing condition adjustment mode. In the period 531, the control unit 103 sets the image capturing condition of the illumination unit 101 and the detection unit 102 to a predetermined condition in accordance with the control sequence of the apparatus described below.

The operation mode of the terahertz wave camera system 100 in the period 532 is an object determination processing mode. In the period 532, the image processing unit 105 makes a determination based on an image of the object 106 captured under the image capturing condition set in the period 531. In the period 532, based on the determination result, the image processing unit 105 determines an image capturing condition (also referred to as an "actual image capturing condition") under which the actual image capturing of the terahertz wave camera system 100 will be performed.

The operation mode of the terahertz wave camera system 100 in the period 533 is an actual image capturing mode. In the period 533, the control unit 103 performs control to perform the actual image capturing of the object 106 under the image capturing conditions determined in the periods 531 and 532. For example, at least the operations from step S501 to step S502 may be performed in the standby period of the terahertz wave camera system 100, and at least step S509 may be performed in the image capturing period of the terahertz wave camera system 100. That is, the standby period of the terahertz wave camera system 100 may be overlapped with the periods 531 and 532, and the image capturing period of the terahertz wave camera system 100 may be overlapped with the period 533.

The detailed flow will be described below. If the operation of the terahertz wave camera system 100 starts, then in step S501, the operation proceeds to the period 531. In the period 531, in step S502, based on the control sequence under a condition 534, the control unit 103 controls the components of the terahertz wave camera system 100. The control unit 103 controls the illumination unit 101. The control unit 103 controls the terahertz wave 107a emitted from the transmission unit 101a and the terahertz wave 107b emitted from the transmission unit 101b. Here, an example is described where the control unit 103 controls the transmission units 101a and 101b and controls the terahertz waves 107a and 107b emitted from the transmission units 101a and 101b, respectively. The control targets of the control unit 103, however, are not limited to these. The control unit 103 may control only the single transmission unit 101a. For example, the control unit 103 according to the present exemplary embodiment may further control the transmission units 101c and 101d and control the terahertz waves 107c and 107d emitted from the transmission units 101c and 101d, respectively. In the control sequence under the condition 534, a plurality of image capturing conditions and the order of carrying out the image capturing conditions are stored. Based on the image capturing condition for the control sequence, the control unit 103 in FIG. 1 controls terahertz waves emitted from the illumination unit 101. For example, in the control sequence under the condition 534, the combinations, the power, and the order of the terahertz waves 107a to 107d emitted from the transmission units 101a to 101d, respectively, are stored.

In the period 531, in step S503, the detection unit 102 measures the terahertz waves 108a and 108b. The terahertz wave camera system 100 acquires image data 535 output from the detection unit 102. The image processing unit 105 converts the image data 535 into the terahertz image 943 illustrated in FIGS. 9A to 9C.

After the image data 535 is acquired, then in step S504, the operation proceeds to the period 532. In the period 532, based on the acquired image data 535, an image capturing condition (an actual image capturing condition) to be applied in the period 533 to which the operation will proceed is determined. The image capturing condition to be used in this actual image capturing is referred to as a "condition 537". In the condition 537, control information regarding the terahertz wave 107a of the transmission unit 101a and control information regarding the terahertz wave 107b of the transmission unit 101b that are to be used in the period 533 are recorded. Further, in the present exemplary embodiment, in the condition 537, control information regarding the terahertz waves 107c and 107d emitted from the transmission units 101c and 101d, respectively, is also recorded. The image capturing condition recorded as the condition 537 according to the present exemplary embodiment and to be used in the actual image capturing includes the selection, from the emission states and the non-emission states, of the operations of the terahertz waves 107a, 107b, 107c, and 107d generated from the transmission units 101a, 101b, 101c, and 101d, respectively. The condition 537 is determined by the image processing unit 105 based on the determination of the image processing unit 105 described below. The detailed operation flow in the period 532 will be described below.

In step S505, the image processing unit 105 extracts a similarity or a correlation. Specifically, the image processing unit 105 extracts at least one of the similarity or the correlation between the terahertz image 943 obtained from the image data 535 and shape data 536. For example, the shape data 536 is the visible image 944 from the visible camera 109. For example, the shape data 536 is the information stored in the database 947. In the present exemplary embodiment, the image processing unit 105 extracts the similarity or the correlation between the object 106 and the covering object 106b.

Next, in step S506, it is determined whether the terahertz image 943 is the concealed object 106a using a result of the extraction. For example, in the present exemplary embodiment, if information regarding the terahertz image 943 has a low similarity to or a low correlation with the covering object 106b included in the shape data 536, it is determined that the terahertz image 943 is the concealed object 106a. If it is determined that the terahertz image 943 is the concealed object 106a, it is determined that the object 106 includes the concealed object 106a. If the information regarding the terahertz image 943 has a high similarity to or a high correlation with the covering object 106b included in the shape data 536, it is determined that the terahertz image 943 is the covering object 106b. The actual image capturing condition may be stored as an image capturing condition for the covering object 106b.

If it is determined that the object 106 includes the concealed object 106a (YES in step S506), then in step S507, the image capturing condition used in the control sequence under the condition 534 is recorded as the condition 537 (the actual image capturing condition). In the recording, the condition 534 can be added or updated to the actual image capturing condition. For example, if the image capturing condition used to determine the concealed object 106a is not included in the actual image capturing condition as the condition 537, the condition 534 is added to the condition 537. If a desired image capturing condition is already recorded in the actual image capturing condition as the condition 537, nothing is performed. If an image capturing condition different from a desired image capturing condition, such as an image capturing condition for the covering object 106b, is recorded in the actual image capturing condition as the condition 537, this image capturing condition is updated and corrected. In the present exemplary embodiment, the concealed object 106a is determined as the object 106. Alternatively, the covering object 106b may be determined.

In step S508, it is checked whether the control sequence under the condition 534 ends. If the control sequence does not end (NO in step S508), the operation returns to the period 531. If the control sequence ends (YES in step S508), then in step S509, the operation proceeds to the actual image capturing mode in the period 533.

In the period 533, under the image capturing conditions determined in the periods 531 and 532, the actual image capturing of the object 106 is performed. In step S510, based on the actual image capturing condition, which is the condition 537, the control unit 103 controls the terahertz wave 107a emitted from the transmission unit 101a and the terahertz wave 107b emitted from the transmission unit 101b.

In the present exemplary embodiment, the transmission units 101a, 101b, 101c, and 101d are controlled in accordance with the condition 537. For example, only a terahertz wave contributing to the observation of the concealed object 106a is brought into the emission state. If the terahertz wave contributing to the observation of the concealed object 106a is the reflected terahertz wave 108a, the control unit 103 brings the transmission unit 101a into the emission state. The terahertz wave 107a is emitted to the object 106. In step S511, in this state, the terahertz wave camera system 100 acquires a terahertz image. An image is captured under such an image capturing condition, thus reducing an unwanted reflected terahertz wave regarding the covering object 106b. This facilitates the acquiring of an image regarding the concealed object 106a in which information regarding the covering object 106b is reduced. While not described in the present exemplary embodiment, the specifying of the concealed object 106a is facilitated also in a case where the concealed object 106a is specified after this.

The operation of such processing enables reduction of an unwanted reflected terahertz wave. Thus, it is possible to acquire an image with reduced noise.

Figure 6A:
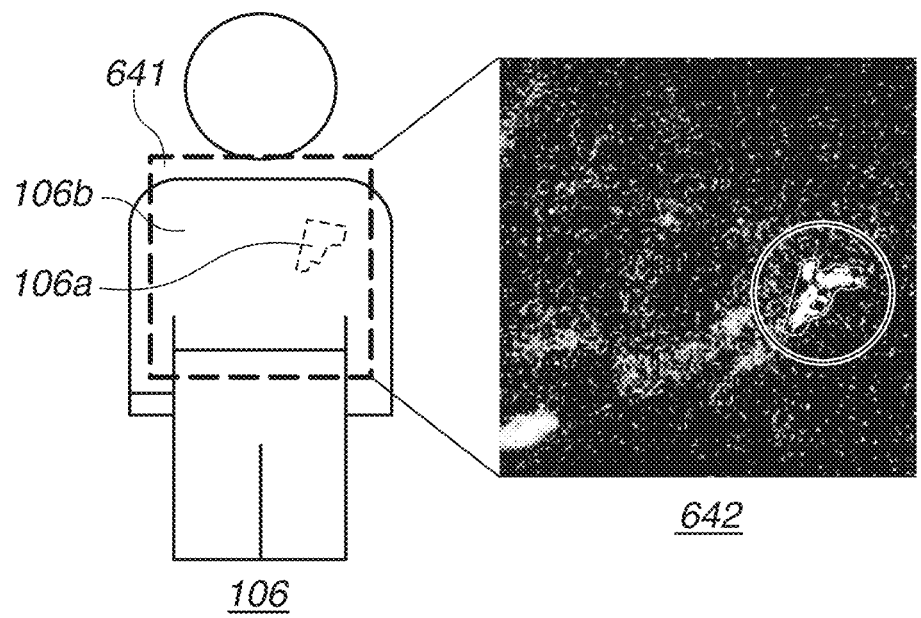
FIGS. 6A and 6B are image diagrams illustrating a terahertz image acquired by the terahertz wave camera system according to the first exemplary embodiment.
Figure 6B:
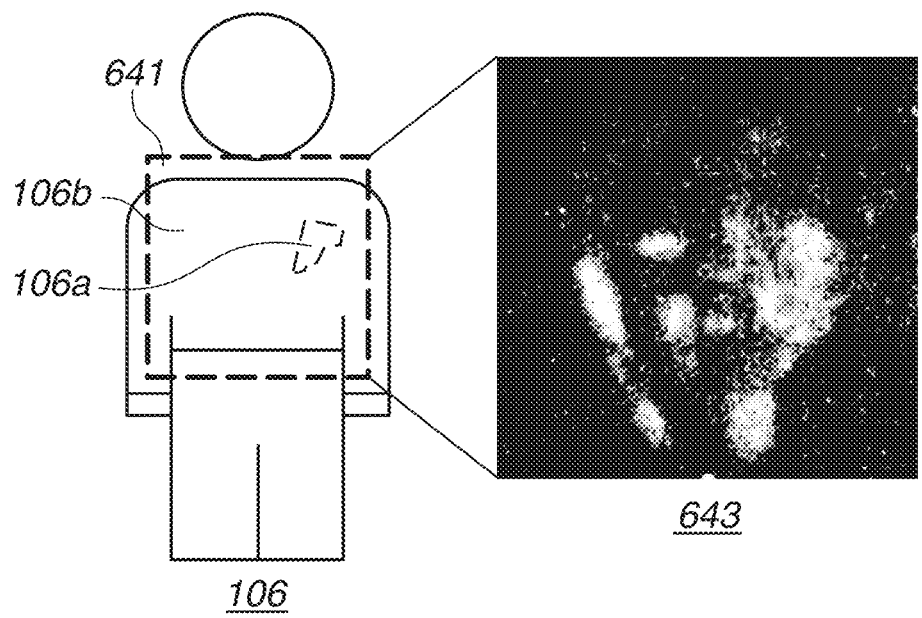

FIGS. 6A and 6B are image diagrams illustrating a terahertz image acquired by the terahertz wave camera system 100 according to the present exemplary embodiment. A portion near the chest of the object 106 is set as an observation area 641. A terahertz wave contributing to the observation of the concealed object 106a is brought into the emission state, so that a terahertz image 642 of the concealed object 106a as illustrated in FIG. 6A is acquired. By contrast, in a case where an observation target of the object 106 is set to the covering object 106b, the terahertz wave contributing to the observation of the concealed object 106a is brought into the stopped state, so that an image in which a terahertz image 643 of the covering object 106b is emphasized as illustrated in FIG. 6B is acquired. In the present exemplary embodiment, the emission state and the stopped state of the terahertz wave are used as examples. Alternatively, the above various examples of the operation of the control unit 103 are applicable.

According to the configuration of the present exemplary embodiment, a terahertz image is obtained in which information other than an observation target of interest is reduced as compared with the image 1091 in which the concealed object 106a and the covering object 106b are conventionally superimposed on each other. This facilitates improvement of the ability to identify the observation target.

The transmission unit 101a includes a housing 200. Each of a plurality of transmission elements 211a, 211b, 211c, and 211d is installed on a supporting substrate 201 of the housing 200. The transmission unit 101a includes a control circuit 202. The control circuit 202 is provided in the housing 200. In the present exemplary embodiment, the control circuit 202 is provided on one of the surfaces forming the outer shape of the housing 200. The control circuit 202 is electrically connected to the control unit 103, and controls the operations of the plurality of transmission elements 211a, 211b, 211c, and 211d in accordance with a control signal from the control unit 103. It can also be said that the housing 200 includes the plurality of transmission elements 211a, 211b, 211c, and 211d and the control circuit 202.

Each of the transmission elements 211a, 211b, 211c, and 211d is obtained by disposing unit cells including elements having gains in the terahertz wave range (a transistor and a diode) and an antenna serving as an external resonant circuit in an array. An example of a useable element having a gain include a resonant-tunneling diode (RTD). For the detailed configuration in this case, Japanese Patent Application Laid-Open No. 2014-200065 can be referenced.

The plurality of transmission elements 211a, 211b, 211c, and 211d is arranged linearly or two-dimensionally. The terahertz wave 107a in FIG. 1 is a set of terahertz waves 207a, 207b, 207c, and 207d in FIG. 2A, and the shape of the terahertz wave 107a differs according to the arrangement of the plurality of transmission elements 211a, 211b, 211c, and 211d. For example, in FIG. 1, the shape of the terahertz wave 107a on a virtual plane parallel to a plane P1 and away from the plane P1 in the emission direction is either one-dimensional or two-dimensional shape. Since a terahertz wave is unlikely to be scattered on the skin surface, the planar (two-dimensional) arrangement of a plurality of terahertz wave transmission elements and the emission of terahertz waves at various angles are effective for the purpose of capturing the shape of an object. Thus, the arrangement of the transmission elements is appropriately set, so that it is possible to generate a terahertz wave having a one-dimensional or two-dimensional beam shape. The planar arrangement of the transmission elements enables terahertz waves to be incident on an observation point on the object at a plurality of incident angles. As a result, a plurality of terahertz waves different in emission angle is emitted from the observation point. This facilitates an increase in the probability that a ray of a terahertz wave from the observation point reaches a lens of a camera. In other words, the planar arrangement of the transmission elements enables scattered light of simulated terahertz waves to be emitted from the observation point on the object. Such an illumination unit 101 can emit terahertz waves to the object 106 at various angles. This is effective for the purpose of capturing the shape of the object 106 using a terahertz wave camera.

FIG. 2B is a diagram illustrating an example of the configuration of the transmission unit 101b. The transmission unit 101b includes a transmission element 311a and a transmission element 311b disposed at a position different from that of the transmission element 311a. In the present exemplary embodiment, the transmission unit 101b further includes transmission elements 311c and 311d. The transmission element 311a emits a terahertz wave 307a, the transmission element 311b emits a terahertz wave 307b, the transmission element 311c emits a terahertz wave 307c, and the transmission element 311d emits a terahertz wave 307d. Suppose that a plane from which the transmission elements 311a, 311b, 311c, and 311d emit the terahertz waves 307a, 307b, 307c, and 307d, respectively, is defined as a plane P2. The number of transmission elements included in the transmission unit 101b is not limited to this. The transmission unit 101b includes a housing 300. Each of the transmission elements 311a, 311b, 311c, and 311d is installed on a supporting substrate 301 of the housing 300. The plurality of transmission elements 311a, 311b, 311c, and 311d is connected to the control unit 103, and the operations of the plurality of transmission elements 311a, 311b, 311c, and 311d are controlled. The detailed configuration and arrangement of the transmission unit 101b are similar to those of the transmission unit 101a, and thus, a description thereof is omitted.

In the present exemplary embodiment, the process for obtaining an image of the concealed object 106a of the object 106 has been described. Alternatively, the covering object 106b can also be selected as a target object. That is, in an object including a plurality of interfaces, it is also possible to reduce an image based on a reflected terahertz wave occurring on an interface other than any of the interfaces.

In the present exemplary embodiment, it is determined whether the shape of an object can be detected. Alternatively, it may be determined whether noise component greater than a prescribed value is included. Examples of the noise component include an unwanted reflected terahertz wave. The noise component can be detected by measurement in advance, and the prescribed value can be set.

The terahertz wave camera system according to the present exemplary embodiment enables acquisition of a terahertz image with reduced noise.

Second Exemplary Embodiment

A terahertz wave camera system according to a second exemplary embodiment will be described with reference to FIGS. 3A and 3B. The terahertz wave camera system according to the present exemplary embodiment is different from the camera system 100 according to the first exemplary embodiment in the control targets of the control unit 103. In the description of the present exemplary embodiment, portions similar to those in the first exemplary embodiment are not described.

Figure 3A:
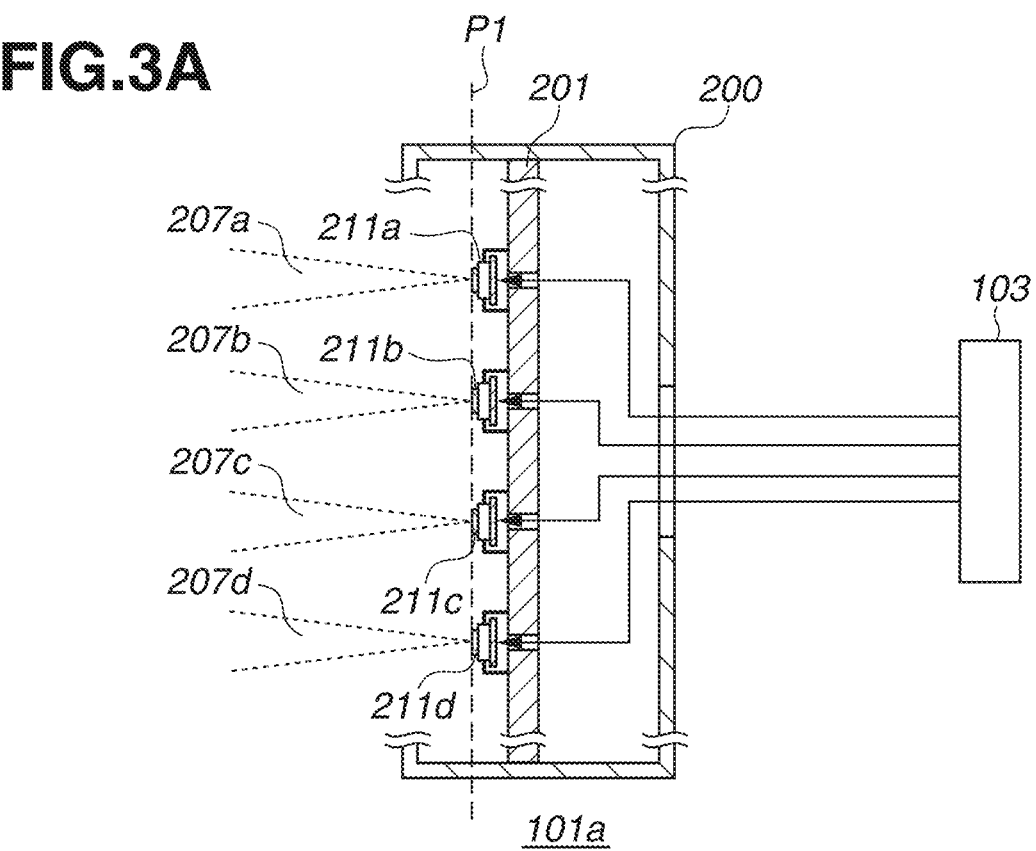
FIGS. 3A and 3B are each a diagram illustrating an example of a configuration of a transmission unit according to a second exemplary embodiment.

FIG. 3A is a diagram illustrating an example of the configuration of the transmission unit 101a included in the illumination unit 101 according to the present exemplary embodiment. As in the transmission unit 101a according to the first exemplary embodiment illustrated in FIG. 2A, the transmission unit 101a includes a plurality of transmission elements 211a, 211b, 211c, and 211d. The transmission element 211a emits a terahertz wave 207a, the transmission element 211b emits a terahertz wave 207b, the transmission element 211c emits a terahertz wave 207c, and the transmission element 211d emits a terahertz wave 207d. Suppose that a plane from which the transmission elements 211a, 211b, 211c, and 211d emit the terahertz waves 207a, 207b, 207c, and 207d, respectively, is defined as a plane P1. The number of transmission elements included in the transmission unit 101a is not limited to this.

The transmission unit 101a includes a housing 200. Each of the plurality of transmission elements 211a, 211b, 211c, and 211d is installed on a supporting substrate 201 of the housing 200. Unlike the transmission unit 101a in FIG. 2A, the transmission unit 101a in FIG. 3A does not include the control circuit 202 illustrated in FIG. 2A. The control unit 103 is electrically connected to the plurality of transmission elements 211a, 211b, 211c, and 211d and controls the operations of the plurality of transmission elements 211a, 211b, 211c, and 211d. The operations and the detailed configurations of other portions of the transmission unit 101a are similar to those in FIG. 2A, and therefore are not described.

Figure 3B:
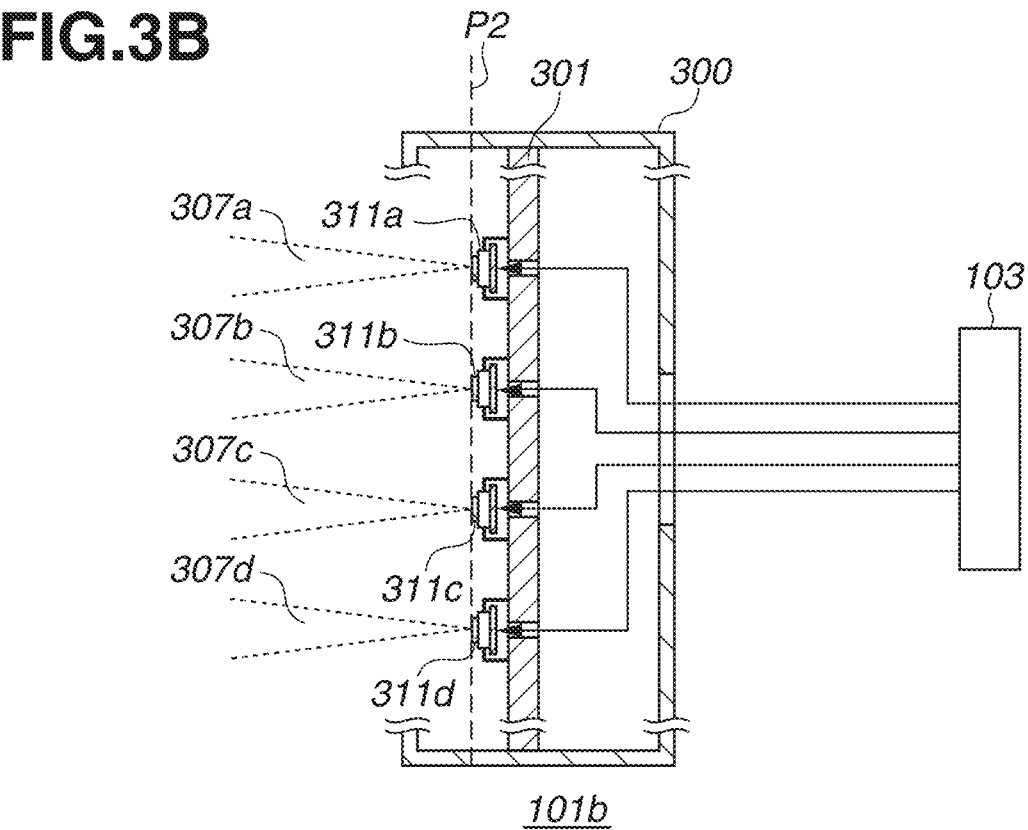

FIG. 3B is a diagram illustrating an example of the configuration of the transmission unit 101b included in the illumination unit 101 according to the present exemplary embodiment. As in the transmission unit 101b according to the first exemplary embodiment illustrated in FIG. 2B, the transmission unit 101b according to the present exemplary embodiment includes a plurality of transmission elements 311a, 311b, 311c, and 311d. The transmission element 311a emits a terahertz wave 307a, the transmission element 311b emits a terahertz wave 307b, the transmission element 311c emits a terahertz wave 307c, and the transmission element 311d emits a terahertz wave 307d. Suppose that a plane from which the transmission elements 311a, 311b, 311c, and 311d emit the terahertz waves 307a, 307b, 307c, and 307d, respectively, is defined as a plane P2. The number of transmission elements included in the transmission unit 101b is not limited to this.

The transmission unit 101b includes a housing 300. Each of the plurality of transmission elements 311a, 311b, 311c, and 311d is installed on a supporting substrate 301 of the housing 300. Unlike the transmission unit 101b in FIG. 2B, the transmission unit 101b in FIG. 3B does not include a control circuit 302 illustrated in FIG. 2B. The control unit 103 is electrically connected to the plurality of transmission elements 311a, 311b, 311c, and 311d and controls the operations of the plurality of transmission elements 311a, 311b, 311c, and 311d. The operations and the detailed configurations of other portions of the transmission unit 101b are similar to those of the transmission unit 101a, and thus are not described.

The control targets of the control unit 103 according to the first exemplary embodiment are the transmission units 101a, 101b, 101c, and 101d included in the illumination unit 101 (see FIG. 1). By contrast, in the present exemplary embodiment, the control unit 103 can also control the plurality of transmission elements included in the transmission units 101a, 101b, 101c, and 101d. According to the configuration of the present exemplary embodiment, it is possible to control a terahertz wave contributing to the observation of a desired target object with more minute accuracy. Thus, the signal-to-noise ratio (SNR) of a terahertz image increases, thus facilitating improvement of the ability to identify the observation target. It is possible to simplify the configuration of the illumination unit 101.

Third Exemplary Embodiment

A terahertz wave camera system 400 according to a third exemplary embodiment will be described with reference to FIG. 4. In the present exemplary embodiment, the terahertz wave camera system 400 is different from the camera system 100 according to the first exemplary embodiment in the configuration of the detection unit 102 and the configurations of control units. In the description of the present exemplary embodiment, portions similar to those in the first exemplary embodiment are not described.

Figure 4:
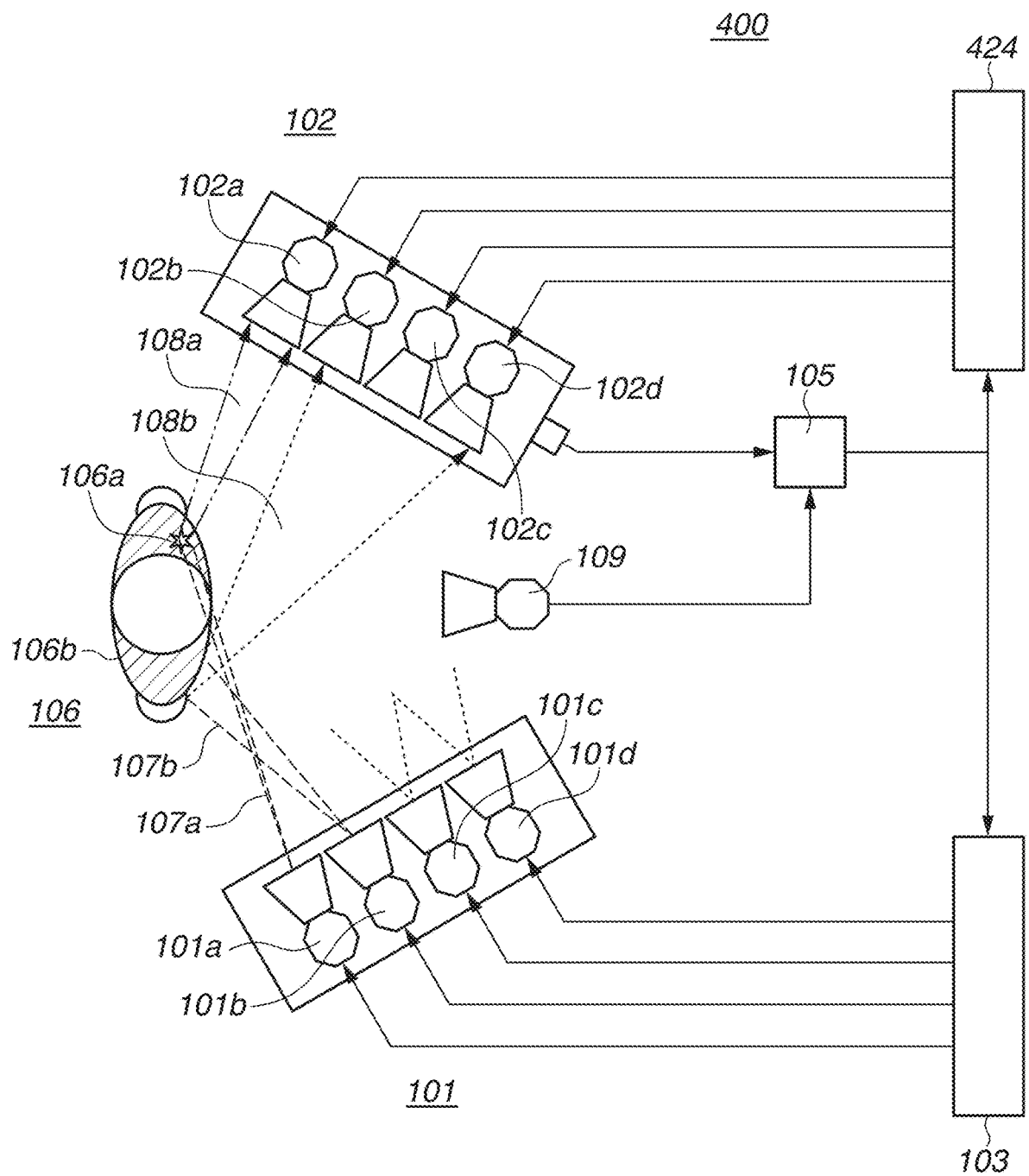
FIG. 4 is a diagram illustrating a configuration of a terahertz wave camera system according to a third exemplary embodiment.

FIG. 4 is a diagram illustrating the configuration of the terahertz wave camera system 400 according to the present exemplary embodiment. The terahertz wave camera system 400 includes at least an illumination unit 101, a detection unit 102, a control unit 103, a control unit 424, and an image processing unit 105. The illumination unit 101 emits terahertz waves to an object 106. The detection unit 102 detects terahertz waves reflected from the object 106. The configuration of the object 106 is similar to that in the first exemplary embodiment, and thus is not described. The terahertz wave camera system 400 includes a visible camera 109. In addition to the configuration of the camera system 100 according to the first exemplary embodiment, the terahertz wave camera system 400 further includes the control unit 424.

The terahertz wave camera system 400 according to the present exemplary embodiment is different from the camera system 100 according to the first exemplary embodiment in the configuration of the detection unit 102. The detection unit 102 includes at least a reception unit 102a and a reception unit 102b disposed at a position different from that of the reception unit 102a. The reception unit 102a detects a terahertz wave, and the reception unit 102b receives and detects a terahertz wave. FIG. 4 illustrates an example where the detection unit 102 includes reception units 102c and 102d in addition to the reception units 102a and 102b. The number of reception units included in the detection unit 102 is not limited to this.

As in the first exemplary embodiment, the control unit 103 controls the operation of the illumination unit 101. The control unit 424 controls the operation of the detection unit 102. In the present exemplary embodiment, the control units 103 and 424 communicate with each other and control the operations of the illumination unit 101 and the detection unit 102, respectively. Alternatively, the image processing unit 105 may be an entirety control unit that controls the entirety of the camera system 400. The control unit 424 controls the operations of the reception units 102a to 102d and controls the outputs of pieces of image data based on received terahertz waves.

For example, the image processing unit 105 may generate a terahertz image from image data output from the reception unit 102a and generate a terahertz image from image data output from the reception unit 102b. For example, the image processing unit 105 may combine the two pieces of image data output from the two reception units 102a and 102b to generate a single terahertz image. The detailed configuration of the image processing unit 105 is similar to that in the first exemplary embodiment, and the image generation unit 942 in FIG. 9A can generate a terahertz image.

Figure 11:
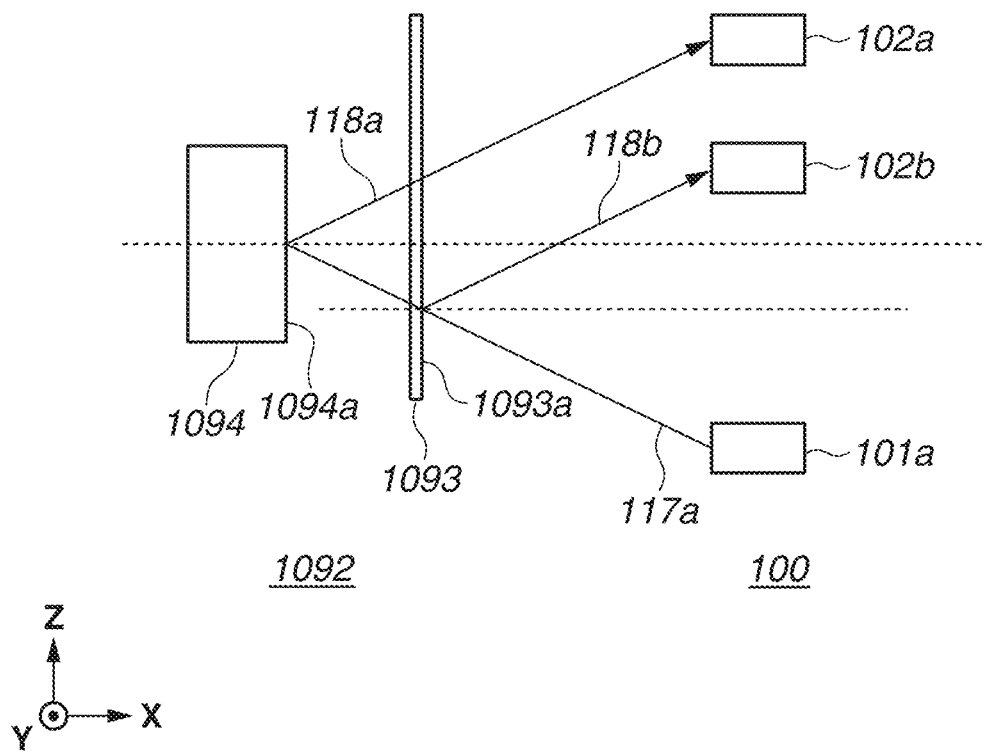
FIG. 11 is a schematic diagram illustrating the terahertz wave camera system according to the third exemplary embodiment.

Referring now to FIGS. 10A and 11, the terahertz wave camera system 400 according to the present exemplary embodiment is described. FIG. 10A is an image diagram illustrating a state where a plurality of terahertz wave reflected images is superimposed on each other, and for describing the present exemplary embodiment. FIG. 11 is a schematic diagram illustrating the state where a plurality of terahertz wave reflected images is superimposed on each other, and for describing the present exemplary embodiment. FIG. 11 schematically illustrates an object 1092 illustrated in FIG. 10A and the main portion of the terahertz wave camera system 400 illustrated in FIG. 4. A description will be given of an example of a case where reflected images are superimposed on each other with reference to FIG. 11. Since FIG. 11 corresponds to FIG. 10B described in the first exemplary embodiment, components similar to the components illustrated in FIG. 10B are designated by the same signs, and are not described.

As illustrated in FIG. 10A, the object 1092 includes a concealed object 1094 and a covering object 1093. In an X-direction, the covering object 1093 is located between the concealed object 1094 and the reception units 102a and 102b. FIG. 10C illustrates the directional axes of terahertz waves. The directional axes are as described in the first exemplary embodiment.

The transmission unit 101a emits a terahertz wave 117a. A part of the terahertz wave 117a is reflected from a surface 1093a of the covering object 1093, and another part of the terahertz wave 117a is reflected from a surface 1094a of the concealed object 1094. The part of the terahertz wave 117a becomes a reflected terahertz wave 118a, and the reflected terahertz wave 118a is detected by the reception unit 102a. Another part of the terahertz wave 117a becomes a reflected terahertz wave 118b, and the reflected terahertz wave 118b is detected by the reception unit 102b. The part of the terahertz wave 117a may attenuate, or may be absorbed. The reflected terahertz wave 118a detected by the reception unit 102a includes information regarding the concealed object 1094, and the reflected terahertz wave 118b detected by the reception unit 102b includes information regarding the covering object 1093. If an image is generated based on the reflected terahertz waves 118a and 118b detected by the two reception units 102a and 102b, respectively, an image 1091 as illustrated in FIG. 10A is generated, in which the covering object 1093 and the concealed object 1094 are superimposed on each other.

To acquire an image of the concealed object 1094, it is desirable to detect the reflected terahertz wave 118a. That is, the image 1091 includes information as noise, such as the covering object 1093 and is an unclear image. In response, in the terahertz wave camera system 400 according to the present exemplary embodiment illustrated in FIG. 4, the control unit 424 performs control for making the output of the reception unit 102a greater than the output of the reception unit 102b or stopping the reception unit 102b. By performing such control, it is possible to reduce the reflected terahertz wave 108b which becomes noise. This enables the terahertz wave camera system 400 to obtain an image in which images superimposed on each other are reduced and noise is reduced.

Further, in the terahertz wave camera system 400 according to the present exemplary embodiment illustrated in FIG. 4, the control unit 103 can control the operation of the illumination unit 101 as described in the first exemplary embodiment. Thus, both the illumination unit 101 and the detection unit 102 are controlled, so that a terahertz image with reduced noise is acquired.

The control of the control unit 424 will be described in detail. To facilitate understanding, the following description will be given on the assumption that the control unit 424 controls the two reception units 102a and 102b. However, the number of reception units that can be controlled by the control unit 424 is not limited to this.

The control unit 424 can perform at least the following three types of control. The control unit 424 can perform control for starting the output of image data from the reception unit 102a and stopping the output of image data from the reception unit 102b. The control unit 424 can perform control for stopping the output of the image data from the reception unit 102a and starting the output of the image data from the reception unit 102b. The control unit 424 can perform control for starting the output of the image data from the reception unit 102a and the output of the image data from the reception unit 102b. That is, the control unit 424 can perform control for switching the presence or absence of the output of the detection unit 102.

Further, the control unit 424 can perform control for adjusting the output of the detection unit 102. For example, the control unit 424 can perform control for making a signal gain for image data to be output from the reception unit 102a (hereinafter, also referred to as reception-unit-102a image data) higher than a signal gain for image data to be output from the reception unit 102b (hereinafter, also referred to as reception-unit-102b image data). The control unit 424 can perform control for making the signal gain for the reception-unit-102a image data lower than the signal gain for the reception-unit-102b image data. The control unit 424 can perform control for making the signal gain for the reception-unit-102a image data equal to the signal gain for reception-unit-102b image data.

The control unit 424 can perform control for reducing the difference between the signal gain for the reception-unit-102a image data and the signal gain for the reception-unit-102b image data. The control unit 424 can perform control for increasing the difference between the signal gain for the reception-unit-102a image data and the signal gain for the reception-unit-102b image data. The control unit 424 can perform control for keeping constant the difference between the signal gain for the reception-unit-102a image data and the signal gain for the reception-unit-102b image data and also change the signal gains for the reception-unit-102a image data and the reception-unit-102b image data. The change in the gain for the output of each reception unit is made by, for example, adjusting the amplification factor of an amplification circuit included in a pixel circuit of the reception unit or a signal processing circuit of the reception unit. Alternatively, the change in the gain of the output of the reception unit is made by adjusting the output of the reception unit by digitally adjusting the output of the reception unit through signal processing. The method for adjusting the output of the reception unit is not limited to these.

The control unit 424 performs thinning through which the operations or the outputs of some of a plurality of reception elements included in each reception unit is stopped, or adds signals of the plurality of reception elements, to reduce the resolution.

As described above, the number of reception units that can be controlled by the control unit 424 is not limited to this description. That is, among a plurality of reception units, the control unit 424 can cause a particular reception unit to operate, stop the particular reception unit, and switch the output of the particular reception unit. Among a plurality of reception units, the control unit 424 can cause a reception unit belonging to a particular group to operate, stop the reception unit belonging to the particular group, and switch the output of the reception unit belonging to the particular group. The control unit 424 thus controls the operation of the detection unit 102, thus reducing an unwanted reflected terahertz wave. This enables acquisition of an image with reduced noise.

The control unit 424 performs such control of the detection unit 102 based on information output from the image processing unit 105. Next, the operation of the image processing unit 105 will be described.

As in the first exemplary embodiment, the image processing unit 105 generates a terahertz image based on image information output from the detection unit 102 and determines the shape or the type of the object 106 based on the terahertz image. As in the first exemplary embodiment, the terahertz wave camera system 400 may include the visible camera 109 also in the present exemplary embodiment. In such a case, the image processing unit 105 can also contrast the terahertz image with a visible image from the visible camera 109 to determine the shape of the object 106. The visible image (e.g., a visible image 944 illustrated in FIGS. 9A to 9C) can also be termed "shape data". With reference to this determination result, the control unit 103 controls the operation of the illumination unit 101, and the control unit 424 controls the operation of the detection unit 102. The configuration of the image processing unit 105 is similar to that in the first exemplary embodiment, and thus is not described.

Figure 7:
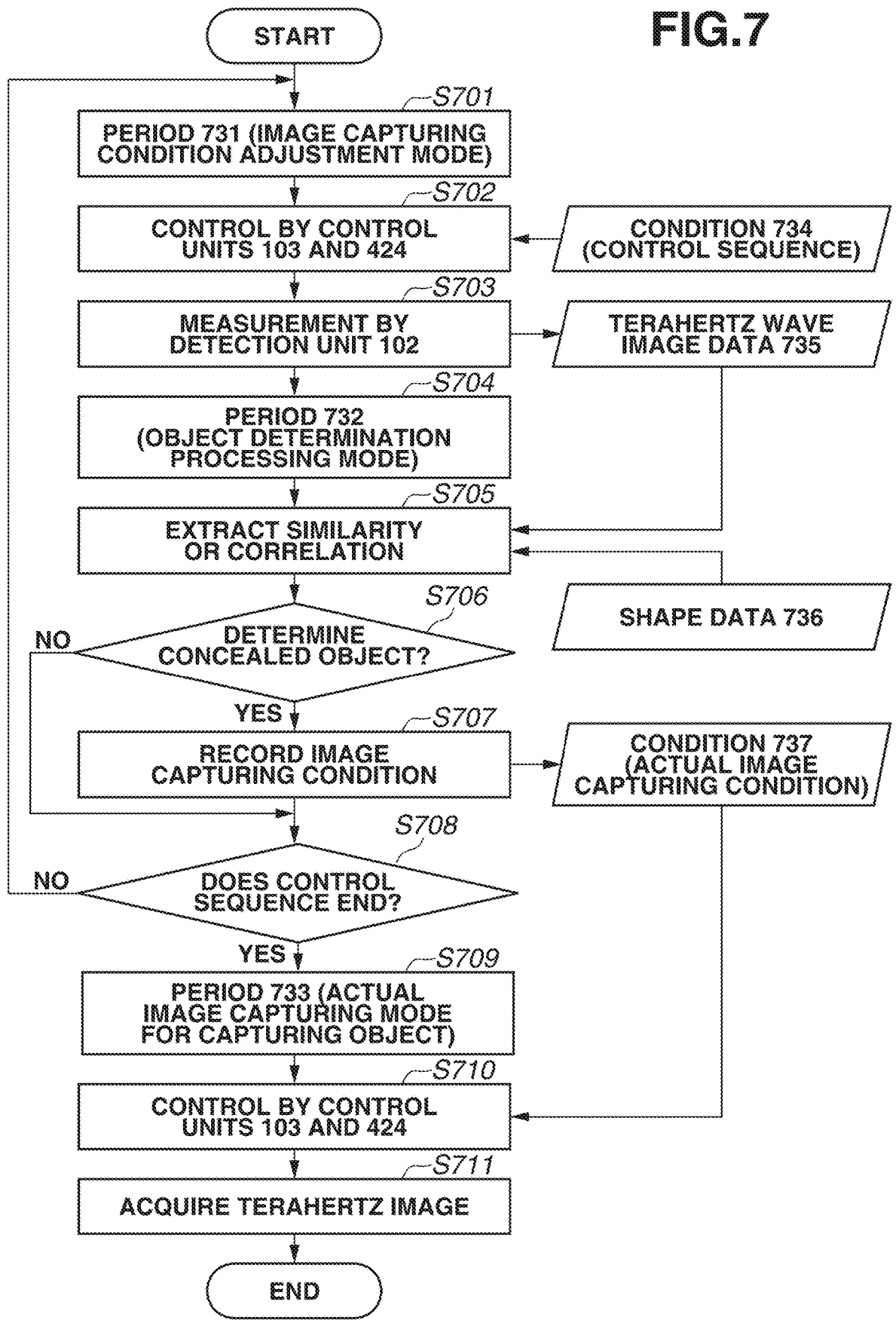
FIG. 7 is a flowchart illustrating an operation flow of the terahertz wave camera system according to the third exemplary embodiment.

The operation of the terahertz wave camera system 400 according to the present exemplary embodiment will be described. FIG. 7 is a flowchart illustrating the operation flow of the terahertz wave camera system 400 according to the present exemplary embodiment. Here, as in the first exemplary embodiment, an operation flow for observing the concealed object 106a will be described.

The operation of the terahertz wave camera system 400 includes at least periods 731, 732, and 733. That is, the operation includes step S701 in the period 731, step S704 in the period 732, and step S709 in the period 733. Every time each of steps S701, S704, and S709 is performed, the operation of the apparatus switches.

The operation mode of the terahertz wave camera system 400 in the period 731 is an image capturing condition adjustment mode. In the period 731, the control units 103 and 424 set the image capturing condition of the illumination unit 101 and the detection unit 102 to a predetermined condition in accordance with the control sequence of the apparatus described below.

The operation mode of the terahertz wave camera system 400 in the period 732 is an object determination processing mode. In the period 732, the image processing unit 105 makes a determination based on an image of the object 106 captured under the image capturing condition set in the period 731. In the period 732, the image processing unit 105 determines, based on the determination result, an image capturing condition under which the actual image capturing of the terahertz wave camera system 400 will be performed (also referred to as an "actual image capturing condition").

The operation mode of the terahertz wave camera system 400 in the period 733 is an actual image capturing mode. In the period 733, the control units 103 and 424 perform control to perform the actual image capturing of the object 106 under the image capturing conditions determined in the periods 731 and 732. The operation in the periods 731 and 732 may be performed in the standby period of the terahertz wave camera system 400, and the operation in the period 733 may be performed in the image capturing period of the terahertz wave camera system 400.

The detailed flow will be described below. If the operation of the terahertz wave camera system 400 starts, then in step S701, the operation proceeds to the period 731. In the period 731, in step S702, the control units 103 and 424 control the components of the terahertz wave camera system 400 based on the control sequence under a condition 734. In the present exemplary embodiment, the control unit 103 controls the operation of the illumination unit 101, and the control unit 424 controls the operation of the detection unit 102. More specifically, the control unit 103 controls the terahertz wave 107a output from the transmission unit 101a and the terahertz wave 107b output from the transmission unit 101b. The control unit 424 controls the output of image data from the reception unit 102a and the output of image data from the reception unit 102b. Here, an example is described where the control unit 103 controls the transmission units 101a and 101b and controls the terahertz waves 107a and 107b emitted from the transmission units 101a and 101b, respectively, and the control unit 424 controls the reception units 102a and 102b and controls the outputs of the pieces of image data from the reception units 102a and 102b. The control targets of the control units 103 and 424, however, are not limited to these. The control unit 424 may control only the single reception unit 102a and control the output of the image data from the reception unit 102a. The control unit 424 may further control the reception units 102c and 102d and control the outputs of pieces of image data from the reception units 102c and 102d. The control unit 103 is similar to that in the first exemplary embodiment, and thus is not described. In the control sequence under the condition 734, a plurality of image capturing conditions and the order of carrying out the image capturing conditions are stored. The control units 103 and 424 control terahertz waves emitted from the illumination unit 101 and the outputs of pieces of image data from the detection unit 102 based on the image capturing condition for the control sequence. For example, in the control sequence under the condition 734, the combinations and the order of the terahertz waves 107a to 107d emitted from the transmission units 101a to 101d, respectively, and the combinations and the order of the reception units 102a to 102d are stored.

In the period 731 in step S703, the detection unit 102 measures the terahertz waves 108a and 108b. The terahertz wave camera system 400 acquires image data 735 including either or both of the pieces of image data output from the reception units 102a and 102b. In the case of FIG. 4, image data including any of the pieces of image data output from the reception units 102a to 102d, or any combination of the pieces of image data, or all of the pieces of image data is output. The image processing unit 105 converts the image data 735 into the terahertz image 943 illustrated in FIG. 9.

After the image data 735 is acquired, then in step S704, the operation proceeds to the period 732. In the period 732, an image capturing condition to be applied in the period 733 (an actual image capturing condition) to which the operation will proceed is determined based on the acquired image data 735. The image capturing condition to be used in this actual image capturing is referred to as a "condition 737". In the condition 737, control information regarding the terahertz wave 107a of the transmission unit 101a, control information regarding the terahertz wave 107b of the transmission unit 101b, control information regarding the image data about the reception unit 102a, and control information regarding the image data about the reception unit 102b that are to be used in the period 733 are recorded. Further, control information regarding another transmission unit or another reception unit can also be recorded. The condition 737 is determined by the image processing unit 105 based on the determination of the image processing unit 105 described below. The detailed operation flow in the period 732 will be described below.

In step S705, the image processing unit 105 extracts a similarity or a correlation. Next, in step S706, using the result of the extraction, the object 106 is determined. If it is determined that the object 106 includes the concealed object 106a (YES in step S706), then in step S707, the image capturing condition of the illumination unit 101 and the detection unit 102 used in the control sequence under the condition 734 is recorded as the condition 737 (the actual image capturing condition). In step S708, it is checked whether the control sequence under the condition 734 ends. If the control sequence does not end (NO in step S708), the operation returns to the period 731. If the control sequence ends (YES in step S708), then in step S709, the operation proceeds to the actual image capturing mode in the period 733. The processes of steps S705 to S709 are similar to those of steps S505 to S509 in the first exemplary embodiment, and thus are not described in detail.

In the period 733, under the image capturing conditions determined in the periods 731 and 732, the actual image capturing of the object 106 is performed. In step S710, based on the condition 737, the control units 103 and 424 control the illumination unit 101 and the detection unit 102. On the basis of the actual image capturing condition as the condition 537, the control unit 103 controls the operations of the transmission units 101a and 101b and controls the terahertz waves 107a and 107b emitted from the transmission units 101a and 101b, respectively. The control unit 424 controls the operations of the reception units 102a and 102b and controls the outputs of the pieces of image data. For example, only a terahertz wave contributing to the observation of the concealed object 106a is brought into the emission state, and the output of image data contributing to the observation of the concealed object 106a is started. To take the models in FIGS. 10B and 11 as examples, the transmission unit 101a that emits the terahertz wave 107a to become the reflected terahertz wave 108a contributing to the observation of the concealed object 106a is brought into the emission state. The reception unit 102a that receives the reflected terahertz wave 108a contributing to the observation of the concealed object 106a is controlled to output the image data.

The control units 103 and 424 perform control as in step S710, so that, in step S711, the terahertz wave camera system 400 can acquire a terahertz image with reduced noise. The capturing of an image under such an image capturing condition reduces an unwanted reflected terahertz wave regarding the covering object 106b. This facilitates the acquisition of an image regarding the concealed object 106a with information regarding the covering object 106b reduced. While not described in the present exemplary embodiment, also in a case where the concealed object 106a is specified after this, it is easy to specify the concealed object 106a.

In the present exemplary embodiment, the control units 103 and 424 may not be physically two units. Further, the control units 103 and 424 and the image processing unit 105 may be a physically single unit.

Fourth Exemplary Embodiment

Figure 8:
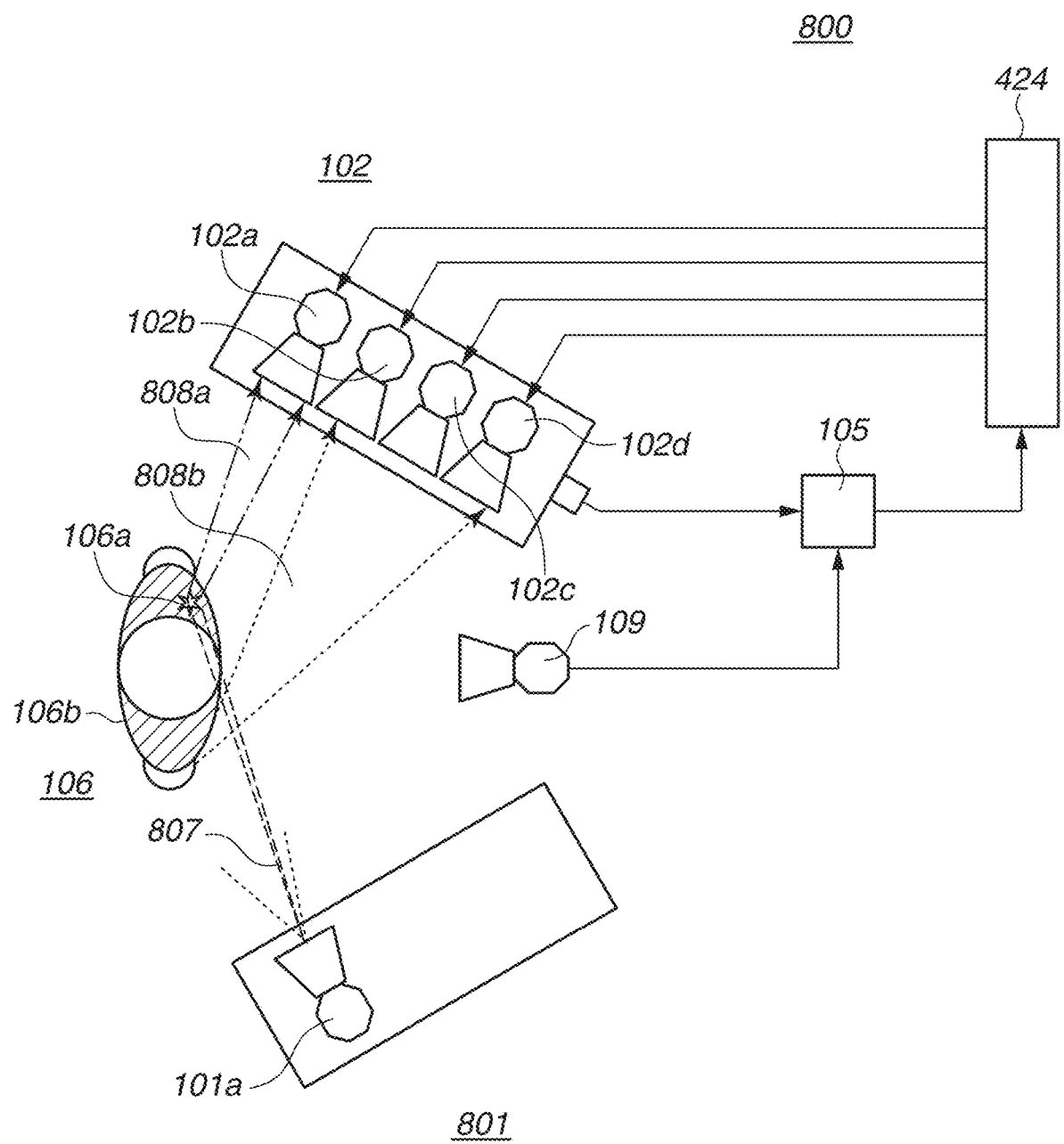
FIG. 8 is a diagram illustrating a configuration of a terahertz wave camera system according to a fourth exemplary embodiment.

Referring now to FIG. 8, a terahertz wave camera system 800 according to a fourth exemplary embodiment will be described. In the description of the present exemplary embodiment, portions similar to those in other exemplary embodiments are not described.

FIG. 8 is a diagram illustrating the configuration of the terahertz wave camera system 800 according to the present exemplary embodiment. The terahertz wave camera system 800 includes at least an illumination unit 101, a detection unit 102, a control unit 424, and an image processing unit 105. The terahertz wave camera system 800 further includes a visible camera 109. These components are similar to those in other exemplary embodiments, and therefore are not described.

In the terahertz wave camera system 800 according to the present exemplary embodiment, the illumination unit 101 includes a single transmission unit 101a, and does not include the control unit 103. The camera system 100 according to the first exemplary embodiment controls the operation of the illumination unit 101, and the camera system 400 according to the third exemplary embodiment controls the operations of both the illumination unit 101 and the detection unit 102. The camera system 800 according to the present exemplary embodiment controls the operation of the detection unit 102. The operation of the control unit 424 and the flow of the camera system 800 according to the present exemplary embodiment are similar to the operation of the control unit 424 and the flow of the camera system 400 according to the third exemplary embodiment.

In this manner, an appropriate adjustment of the operation of at least one of the illumination unit 101 or the detection unit 102 enables noise of a terahertz image to be reduced.

Fifth Exemplary Embodiment

Figure 14A:
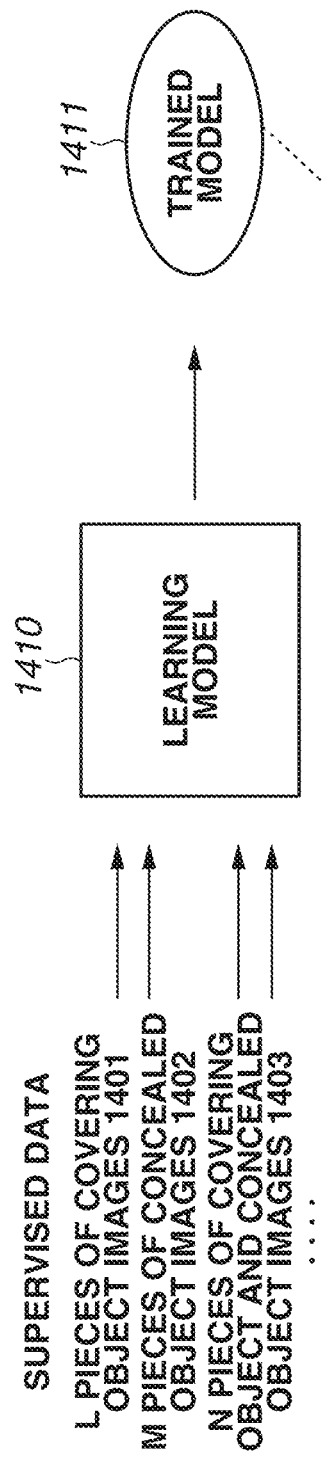
FIGS. 14A and 14B are diagrams illustrating a learning model according to a fifth exemplary embodiment.
Figure 14B:
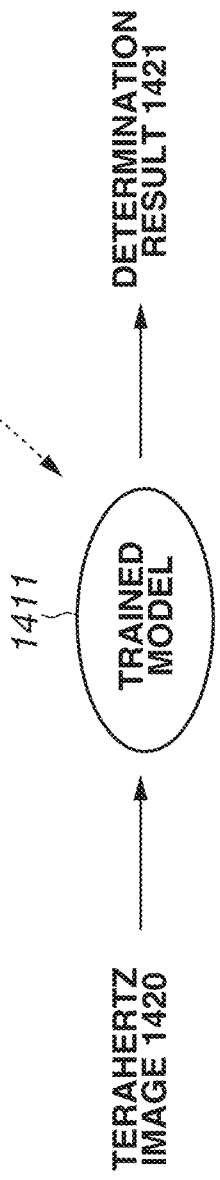

FIGS. 14A and 14B are diagrams illustrating a learning phase and an estimation phase, respectively, of an AI unit that makes a determination in a terahertz wave camera system according to a fifth exemplary embodiment. In this example, a case will be described where a concealed object is determined. FIG. 14A is a conceptual diagram of the learning phase. A learning model 1410 has a shape determination algorithm. Supervised data is input to the learning model 1410. The supervised data is, for example, concealed object images 1402. Additionally, depending on the determination, terahertz images, such as covering object images 1401 and covering object and concealed object images 1403 can also be used as the supervised data. The covering object images 1401 include a plurality of terahertz images obtained by capturing different covering objects. The covering object images 1401 include a plurality of terahertz images obtained by capturing a covering object through the operations of different illumination units 101. The concealed object images 1402 include a plurality of terahertz images obtained by capturing different concealed objects. The concealed object images 1402 include a plurality of terahertz images obtained by capturing a concealed object through the operations of different illumination units 101. The concealed object images 1402 include an image (shape data) indicating the contour of a concealed object. The covering object and concealed object images 1403 include a plurality of terahertz images obtained by capturing different covering objects and concealed objects. The covering object and concealed object images 1403 include a plurality of terahertz images obtained by capturing a covering object and a concealed object through the operations of different illumination units 101. For example, the covering object images 1401, the concealed object images 1402, and the covering object and concealed object images 1403 may include visible light images. Labels are assigned to the images included in the covering object images 1401, the concealed object images 1402, and the covering object and concealed object image 1403. The supervised data is input, so that a trained model 1411 with higher accuracy than the algorithm of the learning model 1410 is generated.

As the specific algorithm of machine learning, a nearest neighbor algorithm, a Naive Bayes algorithm, a decision tree, or a support-vector machine may be used. Alternatively, deep learning may be used in which AI itself generates a feature amount for learning and a connection weight coefficient, using a neural network. For example, as a model of deep learning, a convolutional neural network (CNN) model may be used.

FIG. 14B is a conceptual diagram of the estimation phase. If a captured terahertz image 1420 is input to the trained model 1411 constructed in the learning phase, a result of specifying a concealed object is output from the trained model 1411. The terahertz image 1420 is, for example, an image based on the image data acquired in step S1202 in FIG. 12A. The processing using the trained model 1411 can be executed by, for example, the image processing unit 105 in FIG. 1.

Sixth Exemplary Embodiment

In a sixth exemplary embodiment, with reference to FIG. 15, a description will be given of another operation flow of the terahertz wave camera system 100 described in the first exemplary embodiment. In the description of the present exemplary embodiment, portions similar to those in other exemplary embodiments are not described.

A terahertz wave camera system 100 according to the present exemplary embodiment has the configuration illustrated in FIG. 1. The terahertz wave camera system 100 may or may not include the visible camera 109.

Depending on the surface shape of an object, a change in the angle of the surface of the object is complicated and differs with respect to each object. Accordingly, with respect to each object, the suitable positional relationship between an illumination unit serving as a light source and a detection unit may change. In a case where the object moves, the positional relationship between the illumination unit serving as the light source and the detection unit may change moment by moment. Depending on such a change in the positional relationship, an unwanted reflected terahertz wave among terahertz waves reflected from the object may be detected. In such a case, an image is obtained on which the component of the unwanted reflected terahertz wave is superimposed and which has a large amount of noise.

Figure 15:
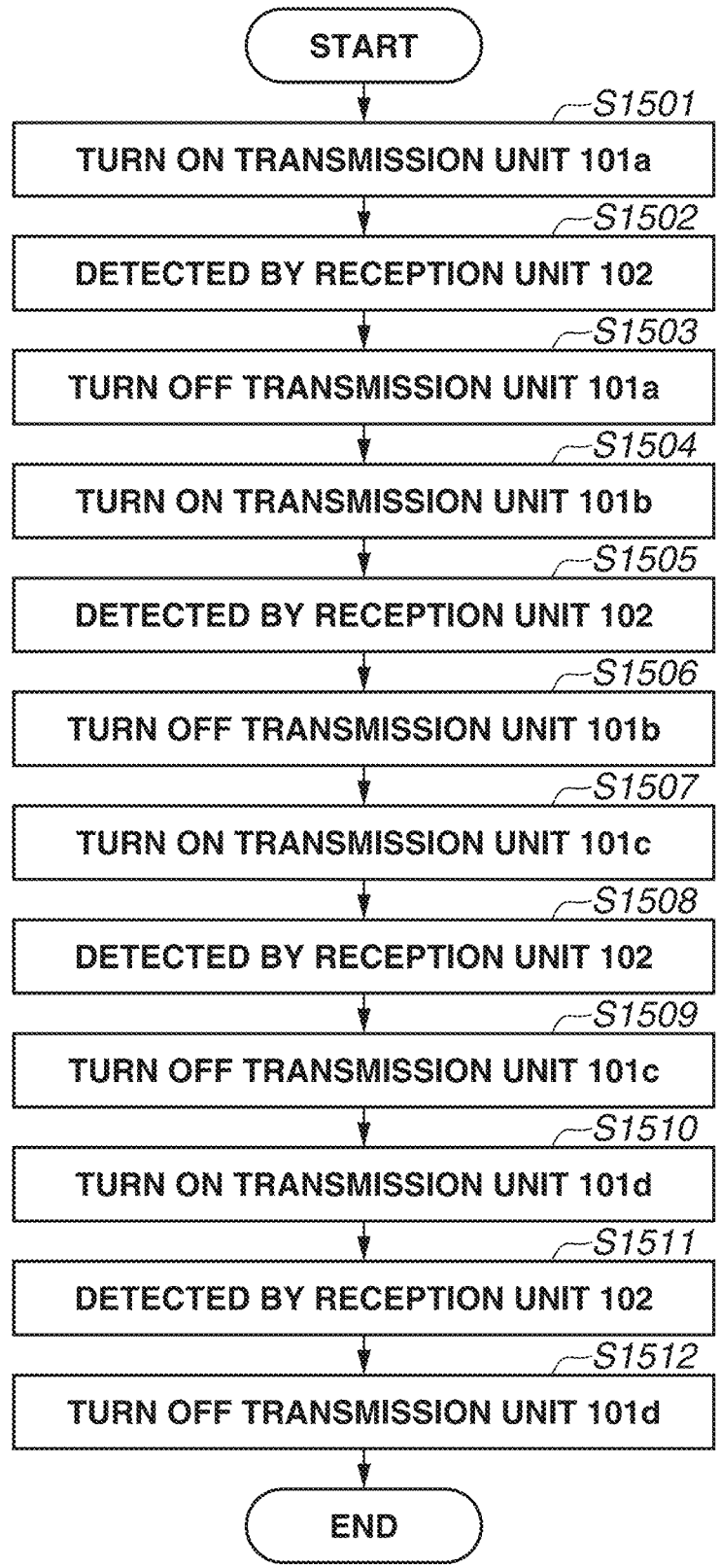
FIG. 15 is a flowchart illustrating an operation flow of a terahertz wave camera system according to a sixth exemplary embodiment.

FIG. 15 is a flowchart illustrating the operation flow according to the present exemplary embodiment. The present exemplary embodiment is characterized by the operation method of the illumination unit 101. The operation of the illumination unit 101 is controlled by the control unit 103. The illumination unit 101 sequentially lights up the transmission units 101a to 101d, and an image is captured with respect to each of the transmission units 101a to 101d. The flow in FIG. 15 illustrates the operation in the image capturing period. In the initial state, the transmission units 101a to 101d are off.

In step S1501, the transmission unit 101a is turned on. In step S1502, the reception unit 102 detects a signal based on the terahertz wave 107a from the transmission unit 101a. In step S1503, the transmission unit 101a is turned off. In steps S1501 and S1502, an image based on the terahertz wave 107a from the transmission unit 101a can be acquired. Next, in step S1504, the transmission unit 101b is turned on. In step S1505, the reception unit 102 detects a signal based on the terahertz wave 107b from the transmission unit 101b. In step S1506, the transmission unit 101b is turned off. In steps S1504 and S1505, an image based on the terahertz wave 107b from the transmission unit 101b can be acquired. Next, in step S1507, the transmission unit 101c is turned on. In step S1508, the reception unit 102 detects a signal based on the terahertz wave 107c from the transmission unit 101c. In step S1509, the transmission unit 101c is turned off. In steps S1507 and S1508, an image based on the terahertz wave 107c from the transmission unit 101c can be acquired. In step S1510, the transmission unit 101d is turned on. In step S1511, the reception unit 102 detects a signal based on the terahertz wave 107d from the transmission unit 101d. In step S1512, the transmission unit 101d is turned off. In steps S1510 and S1511, an image based on the terahertz wave 107d from the transmission unit 101d can be acquired.

As described above, the plurality of the transmission units 101a to 101d is sequentially turned on, thus facilitating selection and acquisition of a suitable image that does not depend on the surface shape of the object. This is suitable, in particular, for a case where the object moves.

The transmission units 101a to 101d are controlled by the control unit 103. The control unit 103 can select a plurality of operations. The plurality of operations includes at least an operation for turning on the transmission unit 101a and turning off the transmission units 101b to 101d, and an operation for turning on the transmission unit 101b and turning off the transmission units 101a, 101c, and 101d. The plurality of operations includes at least an operation for turning on the transmission unit 101c and turning off the transmission units 101a, 101b, and 101d, and an operation for turning on the transmission unit 101d and turning off the transmission units 101a to 101c.

While the operation flow illustrated in FIG. 15 is performed, a suitable image capturing condition may be determined as illustrated in FIG. 5. In other words, in the period 531 in the operation flow in FIG. 5, the operation flow in FIG. 15 may be performed, and an image capturing condition may be extracted from at least four images. That is, after the operation flow in FIG. 15, a determination may be made, and the image capturing condition may be extracted. The determination may be made by, in addition to the detection of the shape or the type of the object, selecting an image in which a noise component does not exceed a prescribed value, or comparing noise components and selecting an image including the smallest noise component. The object may be captured using the extracted image capturing condition. The image capturing condition is extracted, for example, when the orientation of the object changes by a greater amount than a reference. A mode may be employed in which the image capturing condition is periodically extracted at time intervals determined in advance, and the image capturing condition is updated.

In the present exemplary embodiment, the transmission units 101a to 101d are sequentially lit up. The aspect of the embodiments, however, is not limited to this. For example, the transmission units 101a and 101b are simultaneously turned on, the reception unit 102 detects signals, and the transmission units 101a and 101b are turned off. Then, the transmission units 101c and 101d are simultaneously turned on, the reception unit 102 detects signals, and the transmission units 101c and 101d are turned off.

The transmission units 101a to 101d are disposed along any single direction as illustrated in FIG. 1. The aspect of the embodiments can be applied to such a plurality of transmission units disposed along a single direction. The aspect of the embodiments is applicable to a plurality of transmission units not only disposed along a single direction but also disposed across a path. The transmission units 101a to 101d sequentially perform the operations of switching to the on states along the arrangement direction, but these operations may not need to be performed in order along the arrangement direction, and the order of the operations can be appropriately changed.

The operation flow according to the present exemplary embodiment can also be changed as follows. The operations of turning off the transmission units 101a to 101c illustrated in steps S1503, S1506, and S1509 may be performed simultaneously with the operations of turning on the transmission units 101b to 101d illustrated in steps S1504, S1507, and S1510, respectively.

The terahertz wave camera system according to the disclosure is not limited to the configurations of the above exemplary embodiments. For example, the terahertz wave camera system may not include a visible camera, and a control unit may be provided outside the system. For example, the control units 103 and 424 and the image processing unit 105 may be a physically integrated component, and the physically integrated component may be stored in a server provided on a network. In the above exemplary embodiments, attention is paid to a covering object and a concealed object. Alternatively, reflection on the skin surface of a human body can also be taken into account. The terahertz wave camera system according to the aspect of the embodiments can be applied to not only a security gate but also any places, such as stairs, an escalator, an elevator, and a walk-through passage. The configurations described in the exemplary embodiments can be appropriately combined together. According to the configuration of the aspect of the embodiments, it is possible to acquire a terahertz image with reduced noise.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-021571, filed Feb. 12, 2020, and Japanese Patent Application No. 2020-199354, filed Dec. 1, 2020 which are hereby incorporated by reference herein in their entirety.

What is claimed is:

1. A system comprising:
a first transmission unit configured to emit a first terahertz wave;
a second transmission unit disposed at a position different from a position of the first transmission unit and configured to emit a second terahertz wave;
a detection unit for detecting at least one of a first reflected terahertz wave that is a part of the first terahertz wave reflected from an object, or a second reflected terahertz wave that is a part of the second terahertz wave reflected from the object, and outputting image data based on the detected terahertz wave; and
a first control unit configured to, under a condition set based on the image data, control at least one of an operation of the first transmission unit or an operation of the second transmission unit.

2. The system according to claim 1, wherein the first control unit performs at least one of
control for causing the first transmission unit to operate and stopping the second transmission unit, or
control for stopping the first transmission unit and causing the second transmission unit to operate.

3. The system according to claim 1, wherein the first control unit performs at least one of
control for making an output of the first terahertz wave from the first transmission unit higher than an output of the second terahertz wave from the second transmission unit, or
control for making the output of the first terahertz wave from the first transmission unit lower than the output of the second terahertz wave from the second transmission unit.

4. The system according to claim 1, wherein the first control unit performs at least one of
control for reducing a difference between an output of the first terahertz wave from the first transmission unit and an output of the second terahertz wave from the second transmission unit, or
control for increasing the difference between the output of the first terahertz wave from the first transmission unit and the output of the second terahertz wave from the second transmission unit, or
control for keeping constant the difference between the output of the first terahertz wave from the first transmission unit and the output of the second terahertz wave from the second transmission unit and changing the outputs of the first terahertz wave and the second terahertz wave.

5. The system according to claim 1, wherein the system operates so as to include
a first period in which the operations of the first transmission unit and the second transmission unit are controlled based on a first condition specifying control of the first transmission unit and the second transmission unit,
a second period in which a second condition specifying control of the first transmission unit and the second transmission unit is created based on first image data output from the detection unit in the first period, and
a third period in which, after the second period, the operations of the first transmission unit and the second transmission unit are controlled based on the second condition, and second image data output from the detection unit is acquired.

6. The system according to claim 1,
wherein the detection unit includes a first reception unit for detecting a terahertz wave, and a second reception unit disposed at a position different from a position of the first reception unit and for detecting a terahertz wave, and
wherein the terahertz wave camera system further comprises a second control unit configured to control at least one of an operation of the first reception unit or an operation of the second reception unit.

7. The system according to claim 6, wherein the second control unit performs at least one of
control for causing an output of image data from the first reception unit to be performed and stopping an output of image data from the second reception unit, or
control for stopping the output of the image data from the first reception unit and causing the output of the image data from the second reception unit to be performed.

8. The system according to claim 6, wherein control for changing a signal gain for image data to be output from the first reception unit and a signal gain for image data to be output from the second reception unit is performed.

9. The system according to claim 6, wherein the system operates so as to include
a fourth period in which a third condition specifying control of the first transmission unit, the second transmission unit, the first reception unit, and the second reception unit is set, and the operations of the first transmission unit, the second transmission unit, the first reception unit, and the second reception unit are controlled based on the third condition,
a fifth period in which, based on image data output from at least one of the first reception unit and the second reception unit in the fourth period, a fourth condition specifying control of the first transmission unit, the second transmission unit, the first reception unit, or the second reception unit is created, and
a sixth period in which, after the fifth period, the operations of the first transmission unit, the second transmission unit, the first reception unit, and the second reception unit are controlled based on the fourth condition, and image data output from at least one of the first reception unit or the second reception unit is acquired.

10. A system comprising:
a first transmission unit configured to emit a first terahertz wave;
a first reception unit configured to receive the first terahertz wave reflected from an object;
a second reception unit disposed at a position different from a position of the first reception unit and configured to receive the first terahertz wave reflected from the object; and
a second control unit configured to control at least one of an operation of the first reception unit or an operation of the second reception unit.

11. The system according to claim 10, wherein the second control unit performs at least one of
control for causing an output of the first reception unit to be performed and stopping an output of the second reception unit, or control for stopping the output of the first reception unit and causing the output of the second reception unit to be performed, or control for causing the output of the first reception unit and the output of the second reception unit to be performed.

12. The system according to claim 10, wherein the second control unit performs at least one of control for making a gain for an output of the first reception unit higher than a gain for an output of the second reception unit, or control for making the gain for the output of the first reception unit lower than the gain for the output of the second reception unit, control for making the gain for the output of the first reception unit equal to the gain for the output of the second reception unit, or control for reducing a difference between the gain for the output of the first reception unit and the gain for the output of the second reception unit, or control for increasing the difference between the gain for the output of the first reception unit and the gain for the output of the second reception unit, or control for keeping constant the difference between the gain for the output of the first reception unit and the gain for the output of the second reception unit and changing the gain for the output of the first reception unit and the gain for the output of the second reception unit.

13. The system according to claim 1, further comprising an image processing unit configured to generate a terahertz image based on the image data output from the detection unit and determine a shape of the object based on the terahertz image.

14. The system according to claim 13, wherein the image processing unit includes a database configured to store model image information including shape data about the object.

15. The system according to claim 13, wherein the image processing unit includes an artificial intelligence unit.

16. The system according to claim 15, wherein the artificial intelligence unit has a deep learning function.

17. The system according to claim 15,
wherein the artificial intelligence unit includes a trained machine learning model, and
wherein the machine learning model is constructed based on image information including shape data.

18. The system according to claim 1, wherein the condition set based on the image data is an image capturing condition which is used when image data based on the first reflected terahertz wave and image data based on the second reflected terahertz wave are compared with each other and the image data having a smaller noise component is acquired.

19. A system comprising:
a first transmission unit configured to emit a first terahertz wave;
a second transmission unit disposed at a position different from a position of the first transmission unit and configured to emit a second terahertz wave;
a third transmission unit disposed at a position different from the positions of the first transmission unit and the second transmission unit and configured to emit a third terahertz wave;
a detection unit for detecting at least any one of a first reflected terahertz wave that is a part of the first terahertz wave reflected from an object, a second reflected terahertz wave that is a part of the second terahertz wave reflected from the object, or a third reflected terahertz wave that is a part of the third terahertz wave reflected from the object, and outputting image data based on the detected terahertz wave; and
a first control unit for selecting a first operation for turning on the first transmission unit and turning off the second transmission unit and the third transmission unit, a second operation for turning on the second transmission unit and turning off the first transmission unit and the third transmission unit, and a third operation for turning on the third transmission unit and turning off the first transmission unit and the second transmission unit.

20. A method for controlling a system comprising a first transmission unit for emitting a first terahertz wave, a second transmission unit disposed at a position different from a position of the first transmission unit and for emitting a second terahertz wave, and a detection unit for detecting at least one of a first reflected terahertz wave that is a part of the first terahertz wave reflected from an object, and a second reflected terahertz wave that is a part of the second terahertz wave reflected from the object, and outputting image data based on the detected terahertz wave, the method comprising, controlling at least one of an operation of the first transmission unit or an operation of the second transmission unit based on the image data output from the detection unit.

21. The system according to claim 1, further comprising a processing unit configured to generate an image from the image data.

22. The system according to claim 1, further comprising a camera configured to detect a wave different from the detected terahertz wave.

23. The system according to claim 10, further comprising a processing unit configured to generate an image from the image data.

24. The system according to claim 10, further comprising a camera configured to detect a wave different from the detected terahertz wave.

25. The system according to claim 19, further comprising a processing unit configured to generate an image from the image data.

26. The system according to claim 19, further comprising a camera configured to detect a wave different from the detected terahertz wave.

27. The method according to claim 20, wherein the system further comprises a processing unit configured to generate an image from the image data.

28. The method according to claim 20, wherein the system further comprises a camera configured to detect a wave different from the detected terahertz wave.

* * * * *